March 31, 1959 F. V. HART ET AL 2,879,526
LEVELING MACHINES
Filed Oct. 2, 1956 26 Sheets-Sheet 1

Inventors
Fred V. Hart
Edwin S. Kant
By their Attorney
Thomas J. Ryan

Inventors
Fred V. Hart
Edwin S. Kant
By their Attorney
Thomas J. Ryan

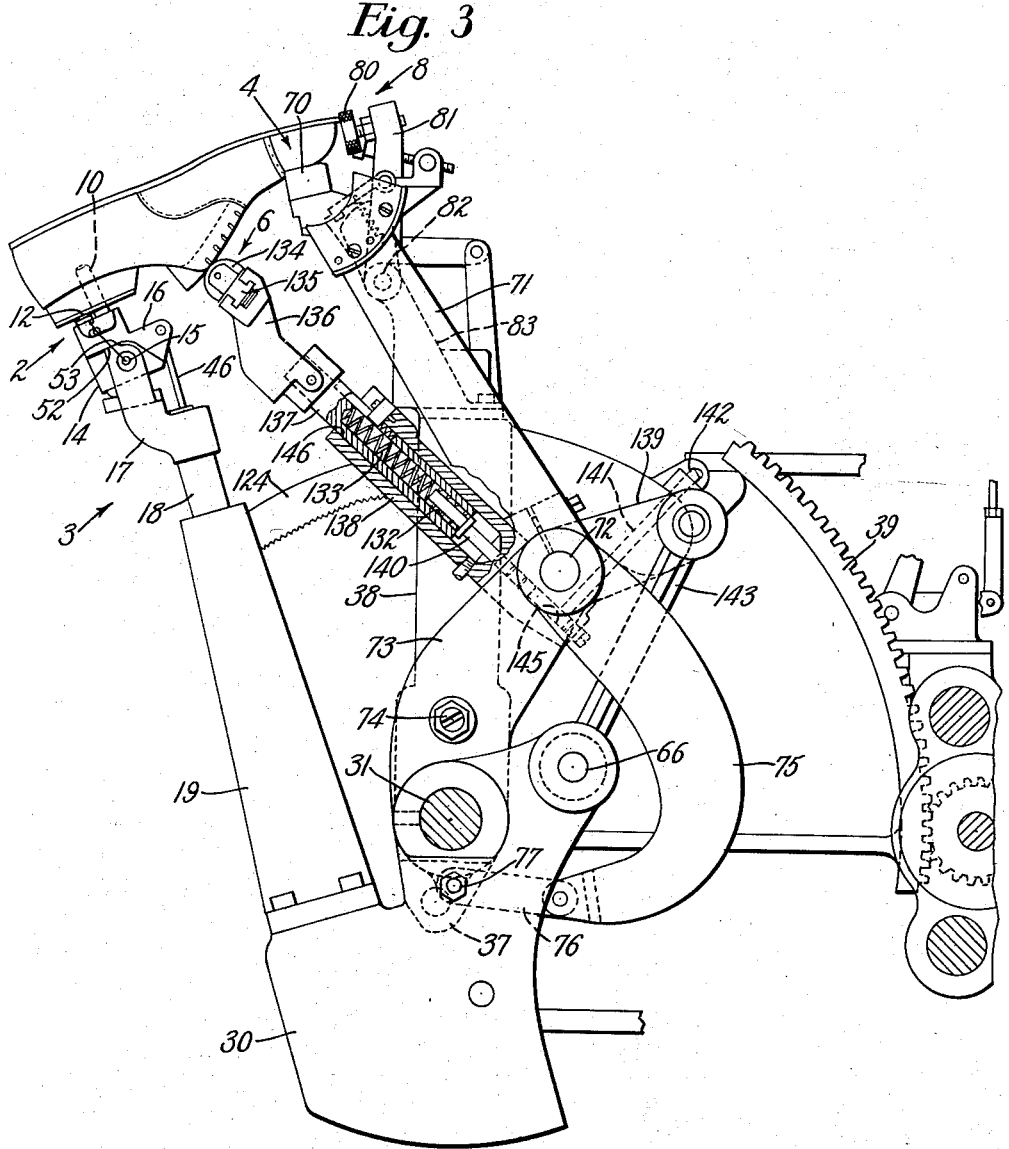

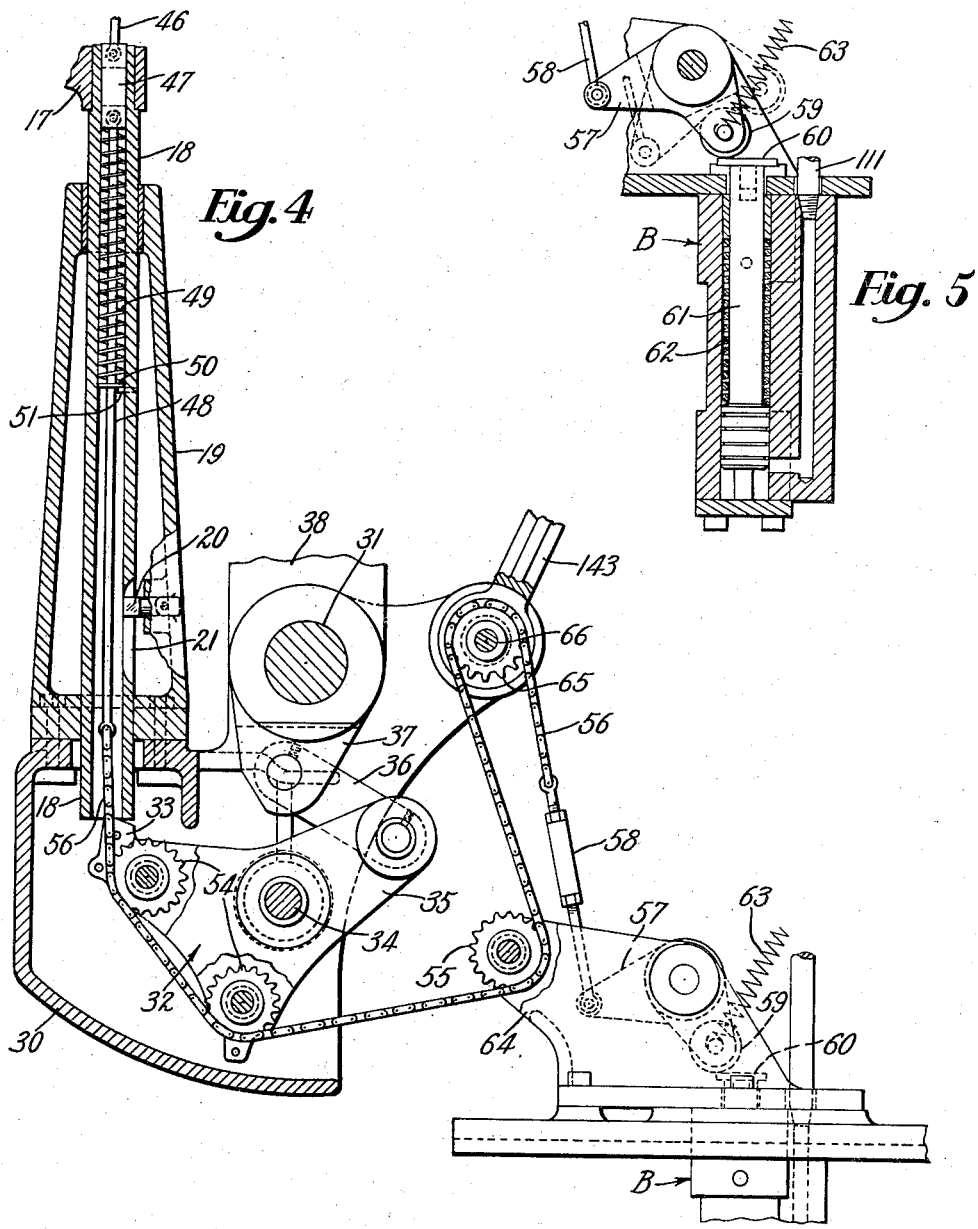

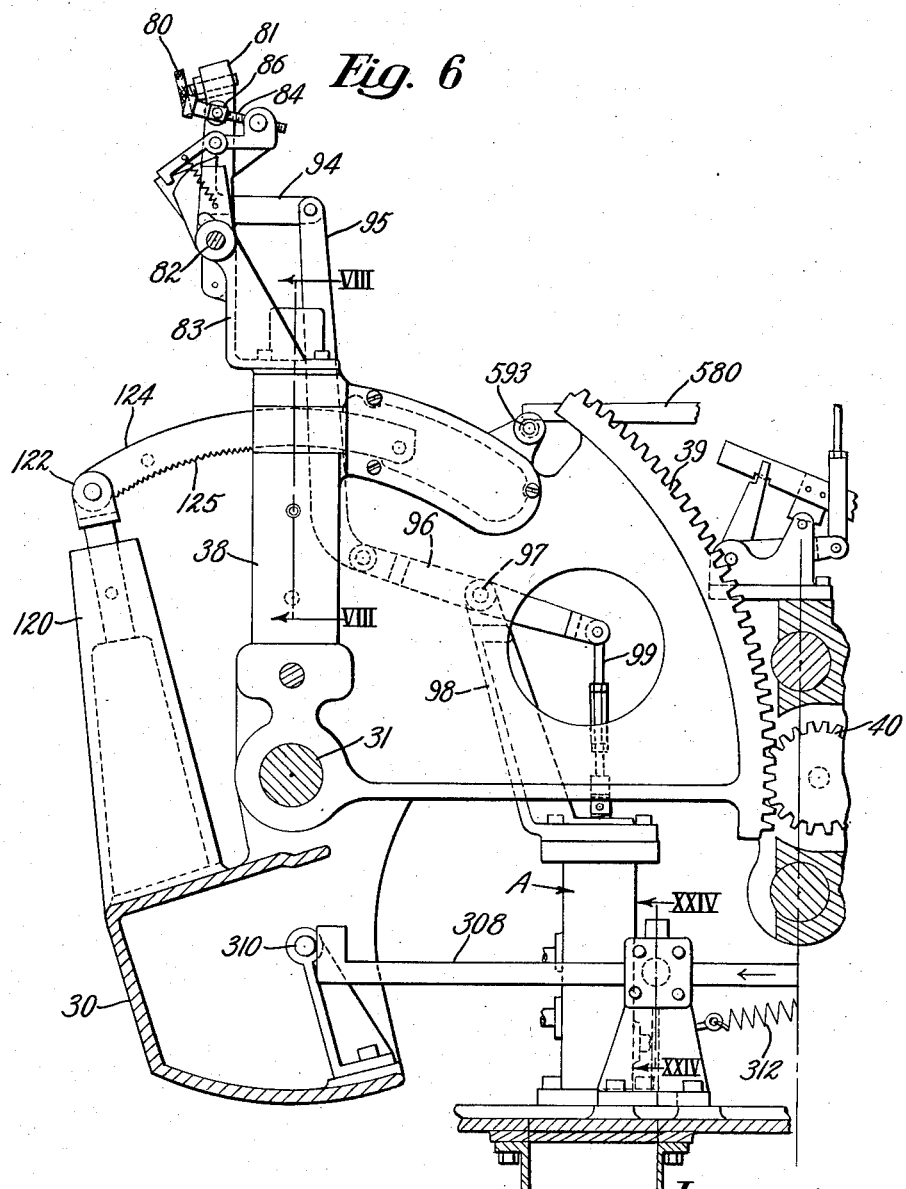

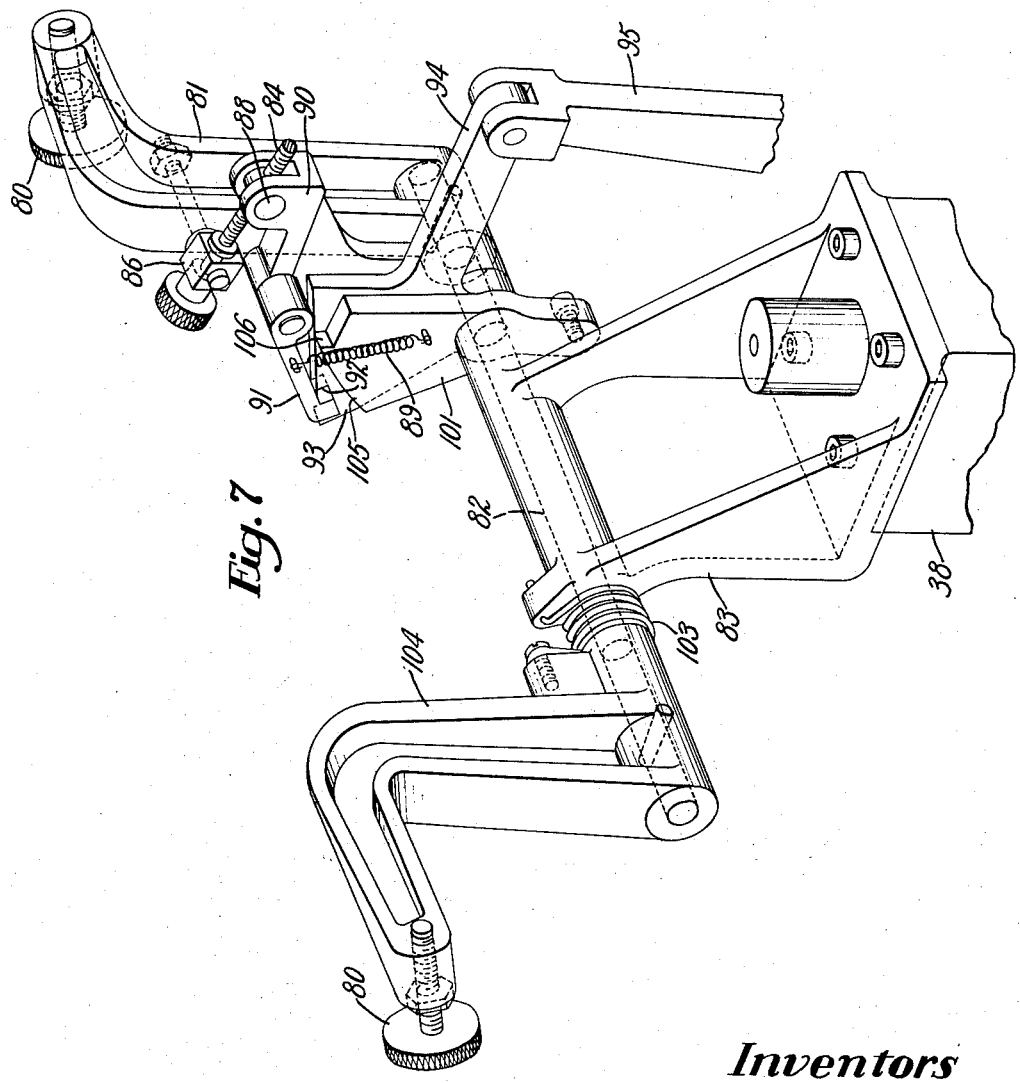

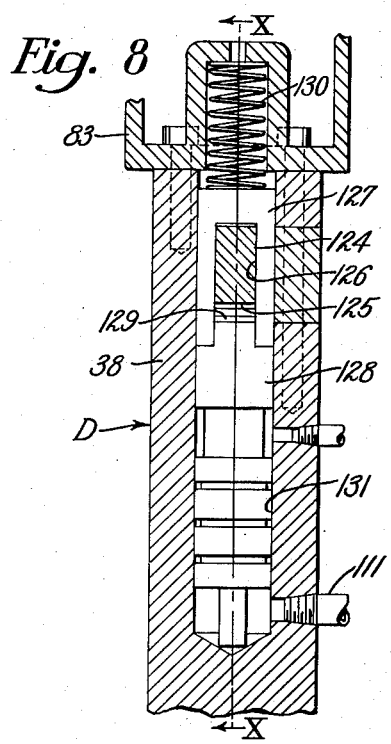
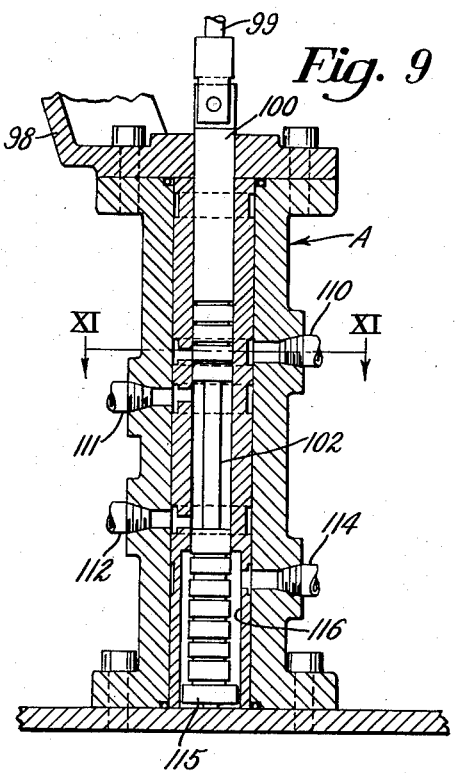
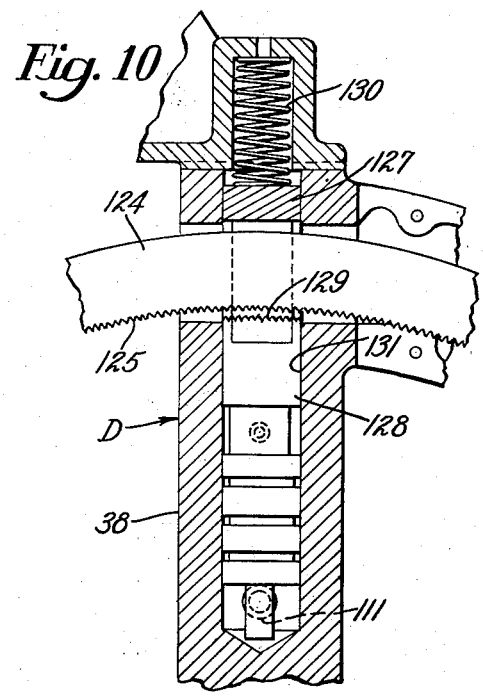
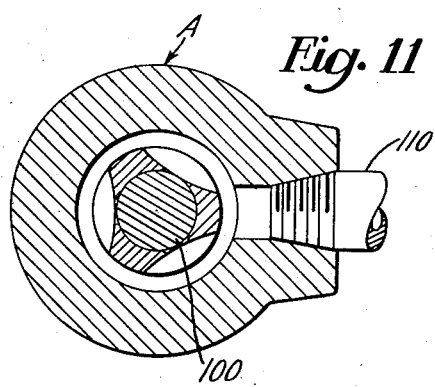
Inventors
Fred V. Hart
Edwin S. Kant
By their Attorney

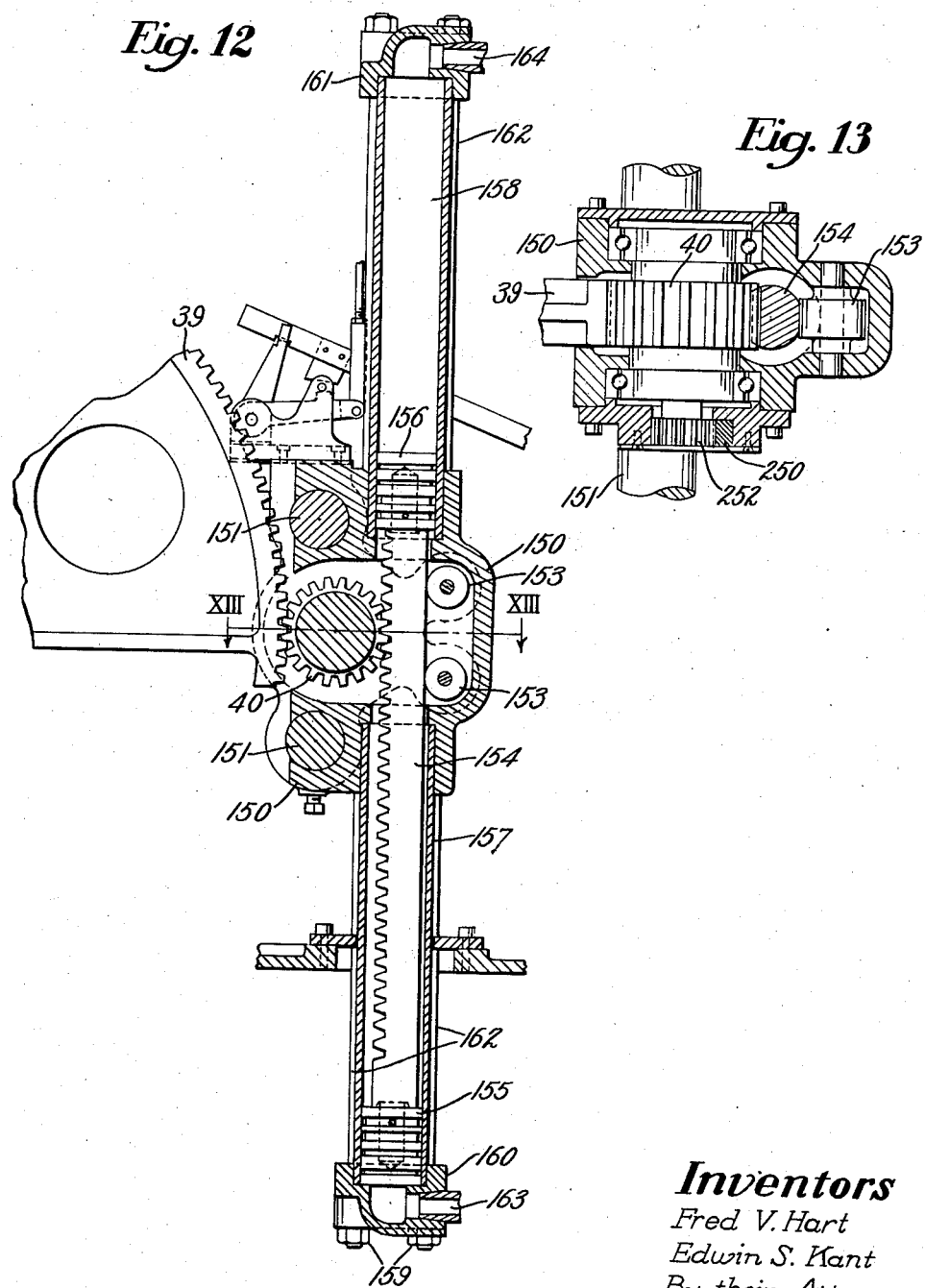

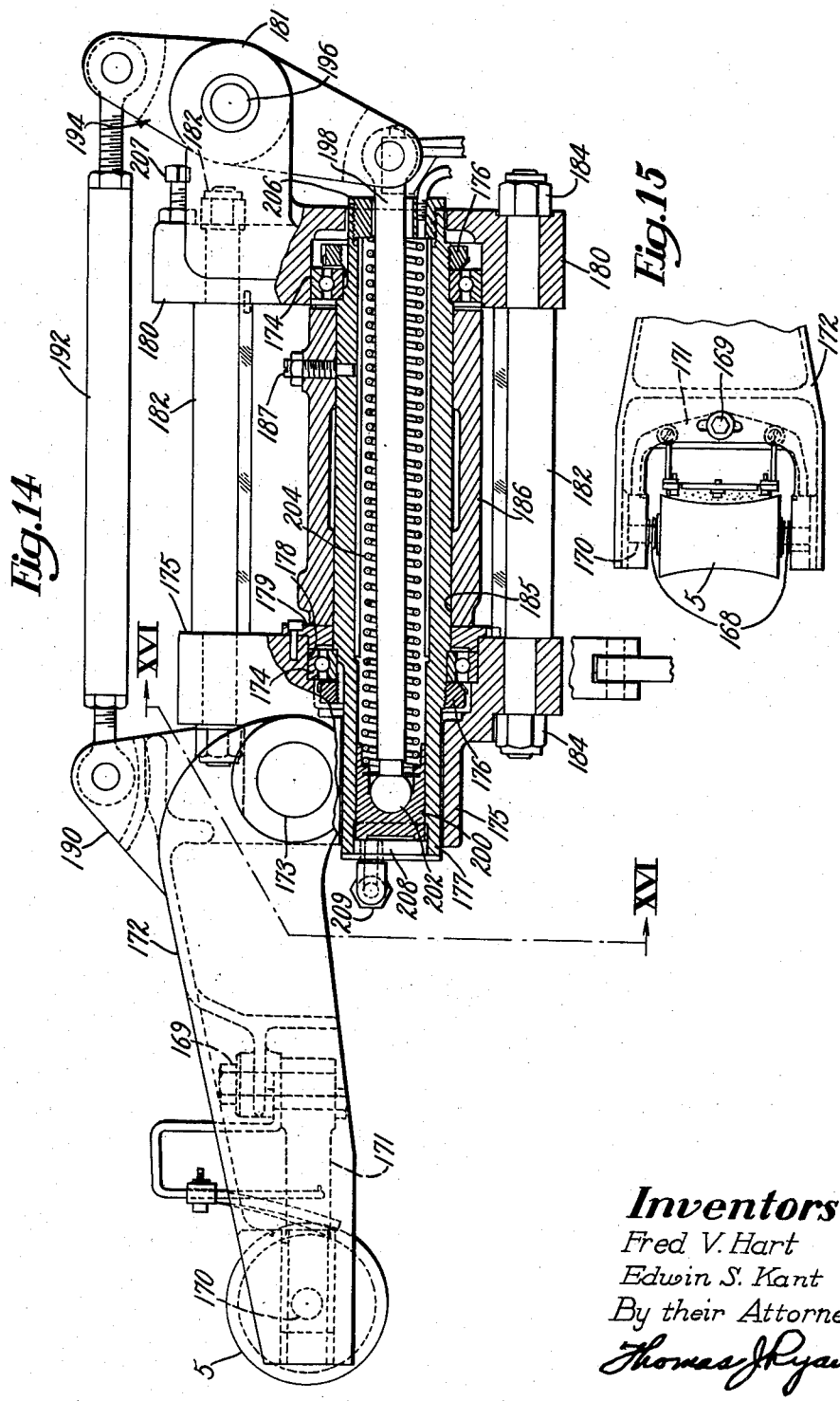

March 31, 1959     F. V. HART ET AL     2,879,526
LEVELING MACHINES

Filed Oct. 2, 1956                                    26 Sheets-Sheet 16

*Inventors*
Fred V. Hart
Edwin S. Kant
By their Attorney
Thomas J. Ryan

March 31, 1959    F. V. HART ET AL    2,879,526
LEVELING MACHINES
Filed Oct. 2, 1956    26 Sheets-Sheet 17

Inventors
Fred V. Hart
Edwin S. Kant
By their Attorney
Thomas J. Ryan.

March 31, 1959    F. V. HART ET AL    2,879,526
LEVELING MACHINES
Filed Oct. 2, 1956    26 Sheets-Sheet 18
Fig. 26
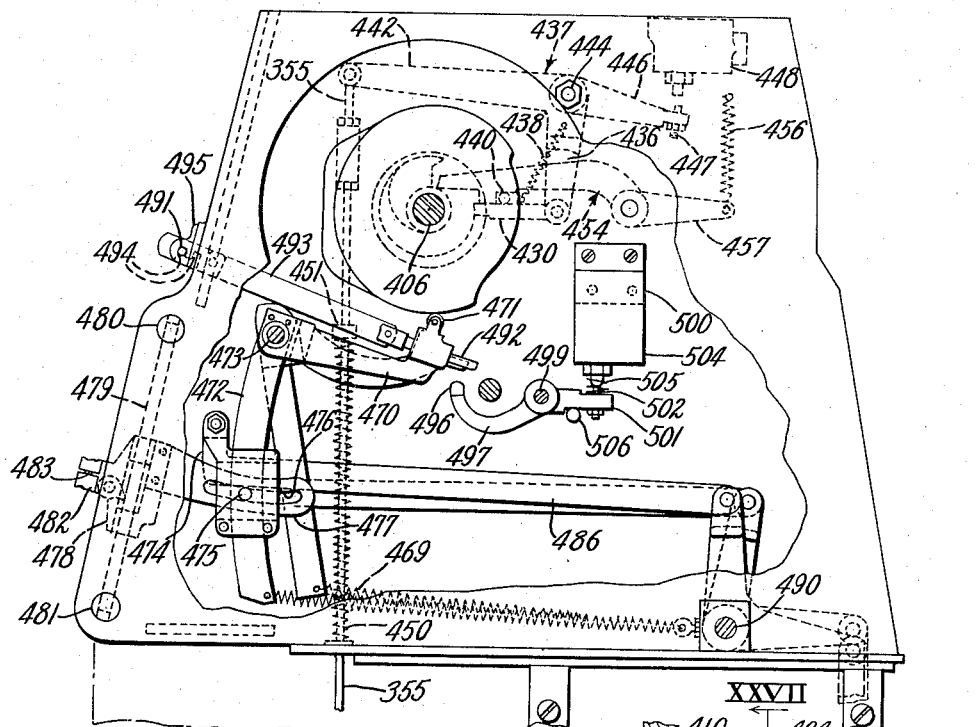
Fig. 27
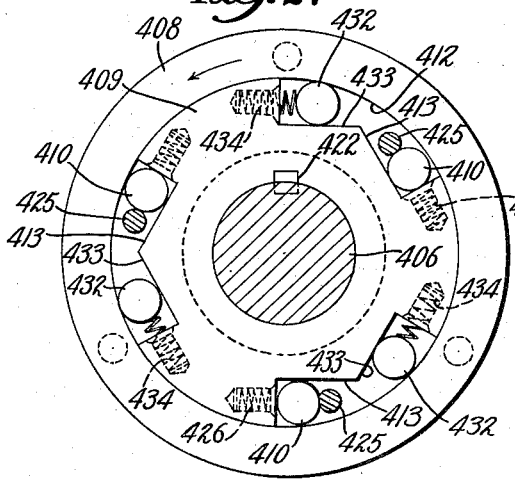
Fig. 28
*Inventors*
Fred V. Hart
Edwin S. Kant
By their Attorney
Thomas J. Ryan Inventors
Fred V. Hart
Edwin S. Kant
By their Attorney
Thomas J. Ryan Inventors
Fred V. Hart
Edwin S. Kant
By their Attorney
Thomas J. Ryan.

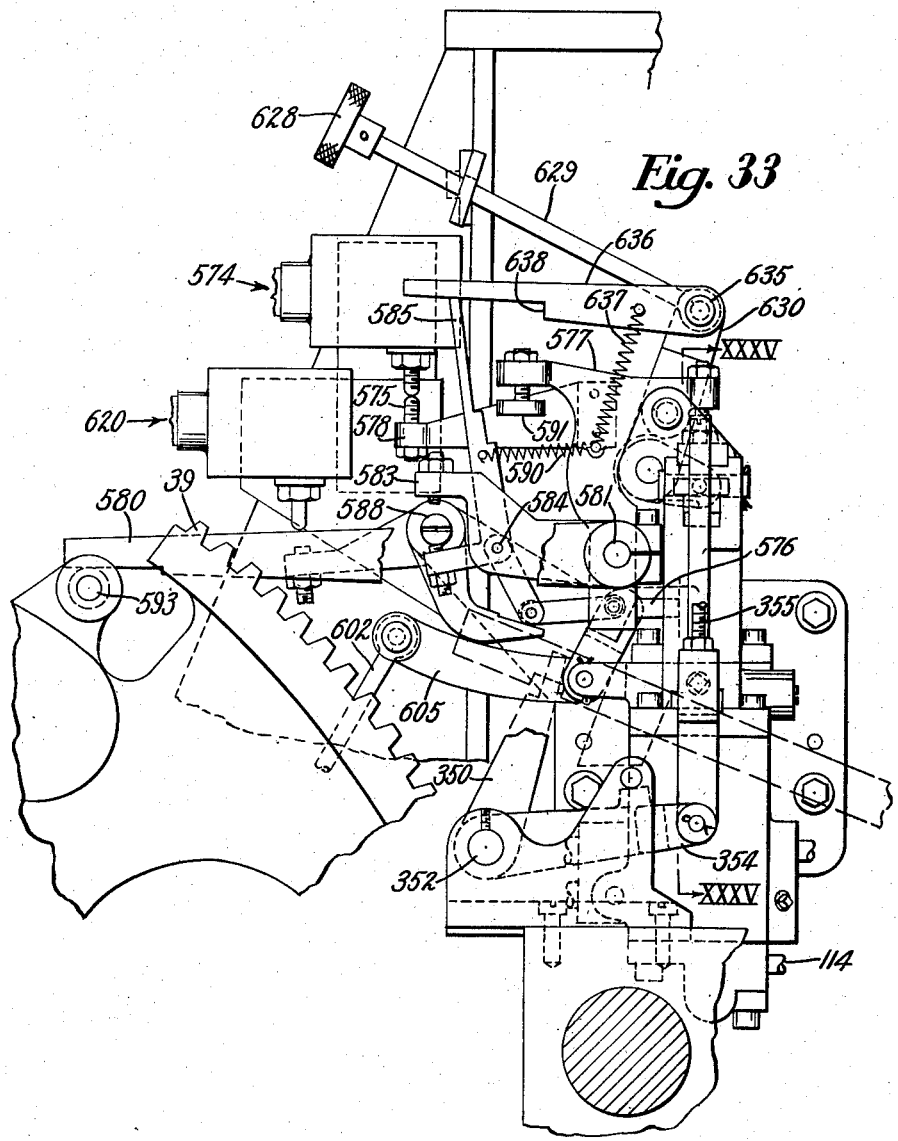

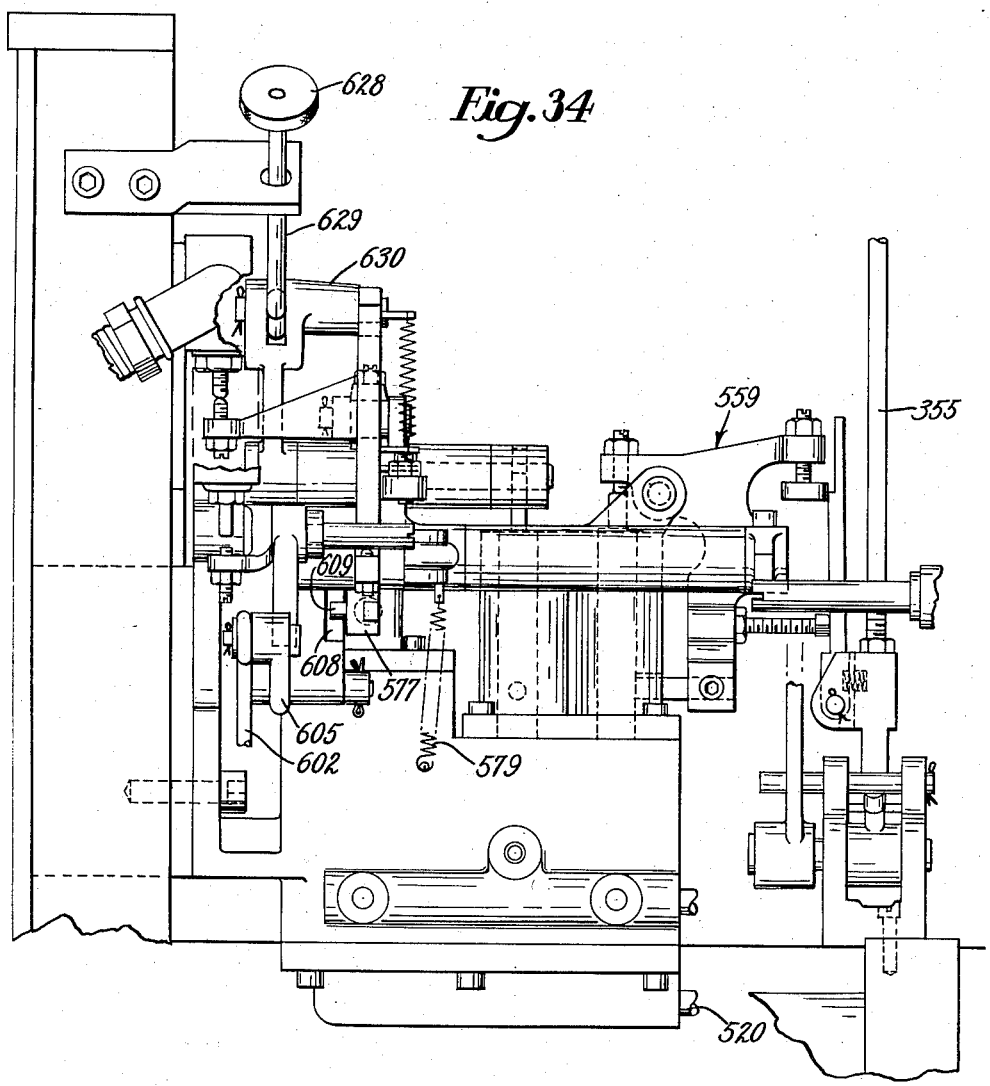

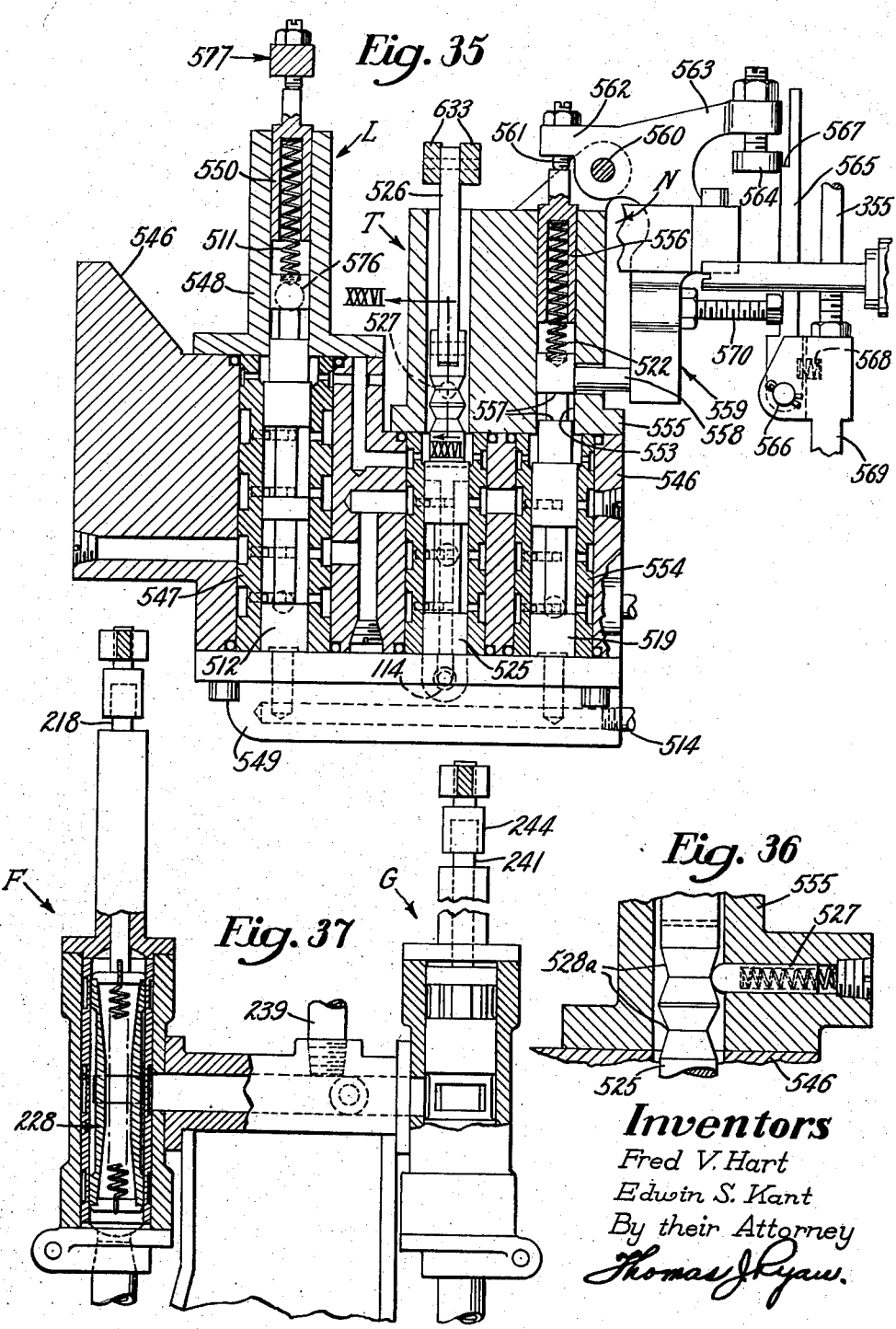

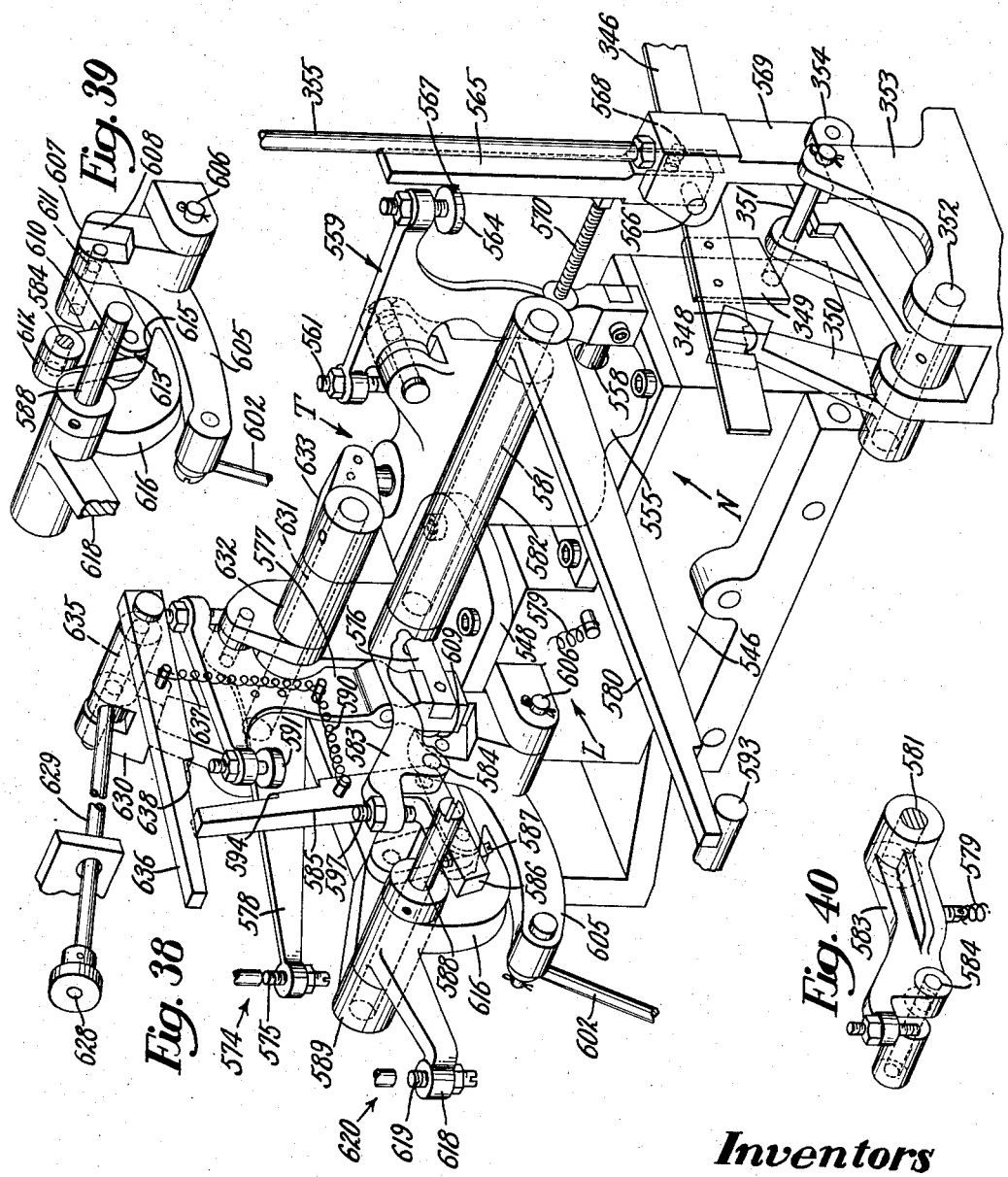

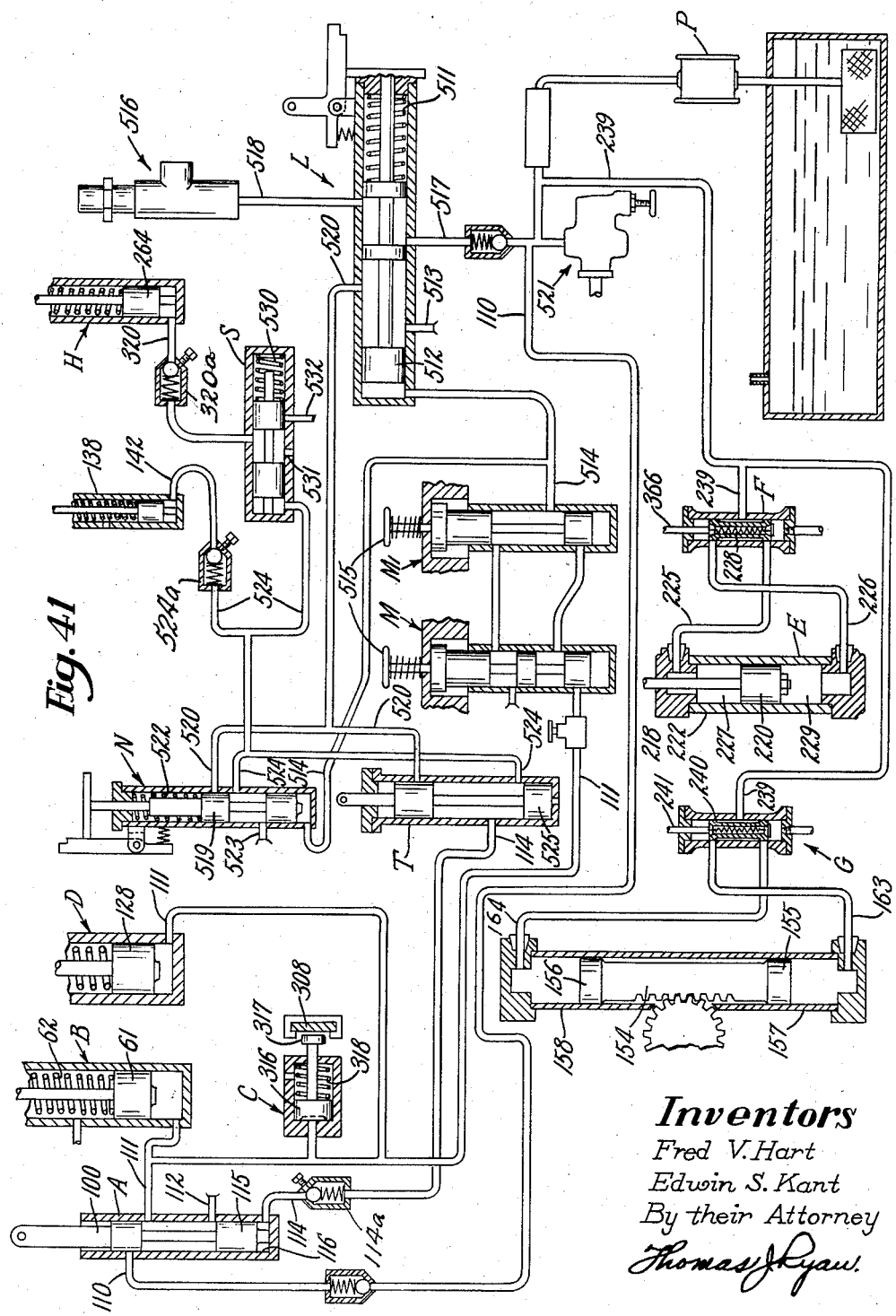

March 31, 1959  F. V. HART ET AL  2,879,526
LEVELING MACHINES
Filed Oct. 2, 1956  26 Sheets-Sheet 26
Fig. 42
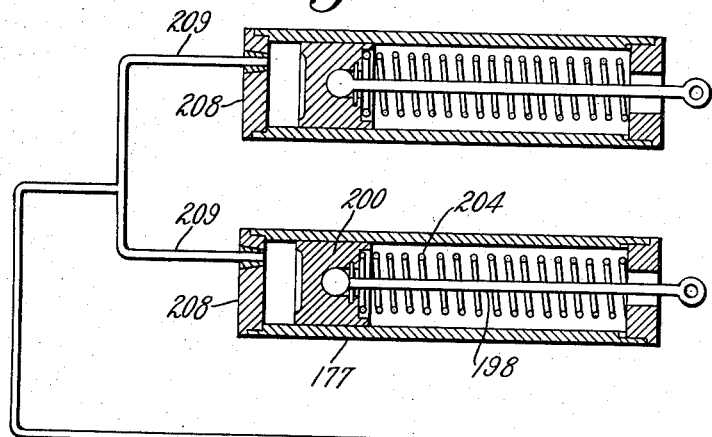
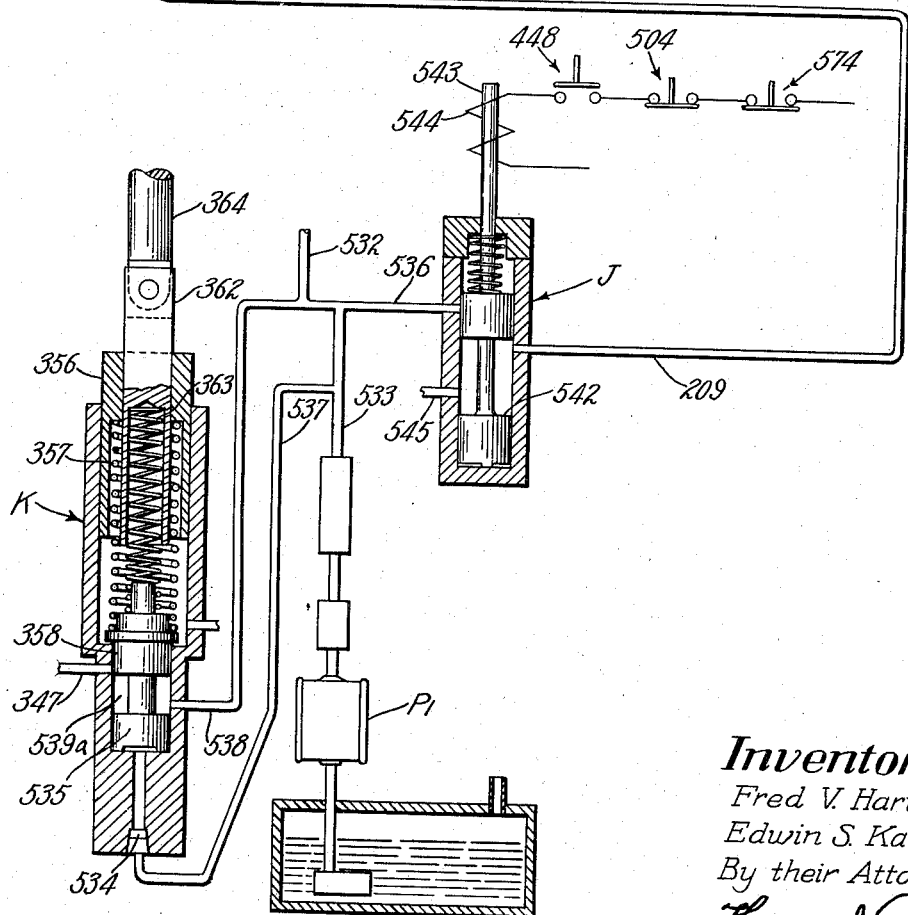
*Inventors*
Fred V. Hart
Edwin S. Kant
By their Attorney
Thomas J. Ryan

United States Patent Office 2,879,526
Patented Mar. 31, 1959

2,879,526

LEVELING MACHINES

Fred V. Hart, Marblehead, and Edwin S. Kant, Melrose, Mass., assignors to United Shoe Machinery Corporation, Flemington, N.J., and Boston, Mass., a corporation of New Jersey Application October 2, 1956, Serial No. 613,441

36 Claims. (Cl. 12—34.5)

This invention relates to machines for operating on shoes and more particularly to machines for shaping or leveling the bottoms of shoes. The invention is herein illustrated with reference to a leveling machine generally of the type shown in Letters Patent of the United States No. 2,439,889, granted April 20, 1948, on an application of Fred V. Hart and Fred L. Mooney. Such machines are provided with a leveling tool, a shoe support, and power operated means for effecting relative movements of the tool and support in opposite directions lengthwise of a shoe on the support to cause the tool to operate progressively along the bottom of the shoe in accordance with a predetermined cycle. Such machines also have provisions for pressing the leveling tool into engagement with the bottom of the shoe, provision also being made for tipping the leveling tool at definite points in the operation along the shoe bottom to vary its inclination relatively thereto. It is to be understood, however, that in its more general applications the invention is not limited to use in machines of the particular type illustrated.

The type of machine illustrated in the above-mentioned patent is provided with automatically controlled power operated means for causing relative movements of the leveling tool and shoe support to cause the tool to operate progressively along the shoe bottom and for tipping the leveling tool in accordance with a predetermined cycle of operations. As therein illustrated, the leveling tool and shoe support are located initially out of operative relation to each other in a direction lengthwise of the shoe, with the tool, however, being in the path of movement of the bottom of the shoe on the support. The machine has automatic means for first causing relative movements of the tool and support to cause the tool to engage the bottom of the shoe followed by a plurality of relative movements to cause the tool to engage different portions of the shoe bottom. Under such conditions the tool must be moved out of the path of movement of the shoe bottom during the initial movement of the shoe support to avoid damage to the toe end of the shoe. Accordingly, it is an object of the present invention to provide improved automatic means for causing the power operated means to move the support from an initial position to a predetermined position beneath the tool which at this time is normally out of the path of movement of the shoe bottom. After the shoe support has reached its predetermined position under the tool, the automatic means causes the tool to be moved relative to the shoe support to engage the shoe bottom, and thereafter the power operated means is caused to impart rearward and forward movements to the support with the tool in engagement with the shoe bottom.

It is essential for the proper leveling of shoe bottoms that the leveling tool commence the application pressure against the shoe bottom at the very tip of the shoe. When operating on shoes having a substantially flat bottom, the shoe support is moved to a predetermined position so that the toe end of the shoe on the support is initially positioned directly under the center of the leveling tool. However, when operating on shoes having a relatively steep inclination of the bottom thereof, such as in women's shoes, initial movement of the shoe support to such a predetermined position would result in the tool initially engaging the shoe bottom somewhat heelwardly of the tip, resulting in improper leveling of such shoes. Accordingly, it is an object of this invention to provide manually selective means for causing the initial movement of the shoe support to be varied a predetermined amount, so that the tool may initially engage the very tip of the shoe bottom of shoes having a relatively steep inclination.

According to a further feature of the invention, provision is made for automatically varying the amount of pressure applied to the shoe bottom by the tool a predetermined amount in accordance with variation of the predetermined position of the shoe support when operating on shoes having a steep inclination of the bottom thereof.

In accordance with another feature of the invention, the shoe support is movable by power operated means automatically controlled by a novel control mechanism in a manner to cause a plurality of precise swinging movements of the shoe support of predetermined directions and extents. The control mechanism comprises a master cam for causing a basic schedule of motions of the shoe support and a plurality of modifying cams, each of which modifies the action of predetermined portions of the master cam. Provision also is made for independently adjusting the output of any modifying cam so as to vary any selected portion of the motion of the shoe support.

In accordance with a still further feature of the invention, power operated means is provided for tipping the leveling tool as automatically controlled by a novel control mechanism in a manner to obtain a predetermined cycle of operations, the control mechanism being arranged to cause a continuous tipping movement laterally of the shoe to be imparted to the leveling tool in timed relation to relative movement of the support and the tool in operating along the shoe bottom. The control mechanism for tipping the tool comprises a plurality of control cams, each of which controls the tipping movement of the tool scheduled for a specific portion of the motion of the shoe support. Provision is also made for independently adjusting the output of any control cam so as to vary the motion of inclination of the tool for any selected portion of the shoe support movement.

The shoe support comprises a toe support, an intermediate support, and a heel support movable relatively to each other to accommodate shoes of different sizes. It is desirable that the toe end of the shoe occupy a predetermined position relatively to the leveling tool, and to insure the proper location of the shoe and accordingly the proper positioning of the heel support, a toe gage is associated with the shoe support. In accordance with another feature of the invention, the heel support, the toe support, and the intermediate support are interconnected so that movement of the heel support relative to the gage according to the size of shoe on the heel support causes predetermined proportional movements between the supports, so that the supports are accurately positioned relatively to each other and to the gage so as to support the shoe thereon properly according to its size. Provision is also made for the heel support and the toe support to be moved heightwise in predetermined amounts as the supports are adjusted for size so that the bottom of any size shoe on the supports is positioned in a predetermined plane relative to the leveling tool regardless of the size of shoe on the shoe support. The shoe support also is provided with means for locking the position of the supports relatively to each other and to the gage in response to engagement of the toe end of the shoe with the gage.

The heel support includes a last pin arranged to be received by the thimble of a last, the last pin being movable about an axis extending transversely of the last so that the toe end of the last may be forced against the toe support, and in accordance with another feature of the invention, the last pin is so moved by power operated means operable in response to engagement of the toe end of the shoe with the toe gage. Provision is also made for varying the force applied by the power operated means in accordance with the size adjustment of the heel support relative to the gage.

In accordance with a further feature of the invention, means is provided for automatically causing release of the last pin moving means and the heel support locking means upon termination of the automatic operation of the machine. The machine is also provided with operator selective means for rendering the automatic shoe releasing means inactive so that the shoe may be retained firmly on the shoe support at the end of the automatic operation of the machine in preparation for subsequent manual operations thereon.

The above and other features of the invention, including various details of construction and novel combinations of parts, will now be described with reference to the drawings and pointed out in the claims.

In the drawings, Fig. 1 is a perspective view of one form of machine in which the invention is embodied;

Fig. 3 is a right side elevation, partly in section, of the shoe support;

Fig. 4 is a vertical section on an enlarged scale through the heel support illustrating a portion of the operating mechanism;

Fig. 5 is a sectional view of the last pin operating cylinder;

Fig. 6 is a side elevation of the toe gage mechanism of the shoe support with parts broken away;

Fig. 7 is a perspective view of the rearward side of the toe gage mechanism;

Fig. 8 is a section on line VIII—VIII of Fig. 6;

Fig. 9 is a vertical section through the toe gage operating cylinder seen in Fig. 6;

Fig. 10 is a section on line X—X of Fig. 8;

Fig. 11 is a section on line XI—XI of Fig. 9;

Fig. 12 is a sectional view of the jack operating cylinders as seen in Fig. 6;

Fig. 13 is a section substantially on line XIII—XIII of Fig. 12;

Fig. 14 is a side elevation, partly in section, of the roll pressure applying cylinder;

Fig. 15 is a plan view of a portion of Fig. 14;

Fig. 26 is a right side elevation of the upper portion of the machine;

Fig. 27 is a section on line XXVII—XXVII of Fig. 28;

Fig. 28 is a section on line XXVIII—XXVIII of Fig. 25;

Fig. 33 is a side elevation of part of the valve control mechanism of the machine;

Fig. 34 is a front elevation of the mechanism illustrated in Fig. 33;

Fig. 35 is a section on line XXXV—XXXV of Fig. 33;

Fig. 36 is a section on line XXXVI—XXXVI of Fig. 35;

Fig. 37 is a rear elevation, partly in section, on a larger scale of the jack and roll tip control valves shown in Fig. 18;

Fig. 38 is a perspective view of the mechanism illustrated in Fig. 33;

Fig. 39 is a perspective view of a portion of the mechanism of Fig. 38;

Fig. 40 is a perspective view of another portion of the mechanism of Fig. 38;

Fig. 41 is a diagrammatic view of the hydraulic system of the machine; and

Fig. 42 is a diagrammatic view of a secondary hydraulic system controlling the roll pressure.

Figure 1:
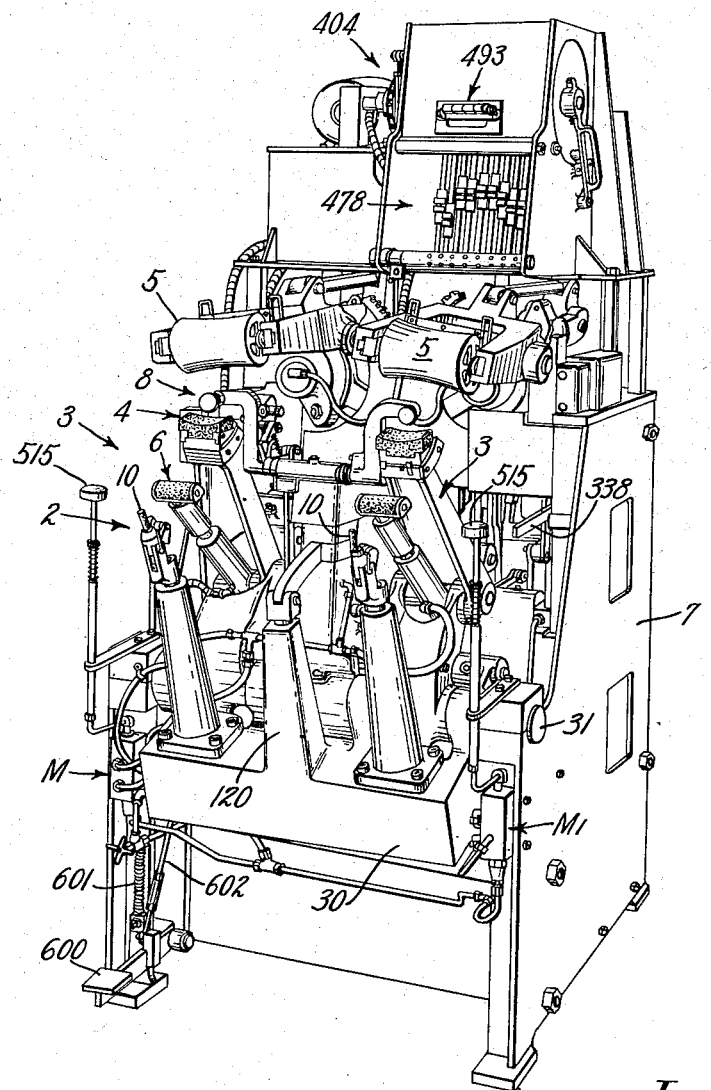
Figure 2:
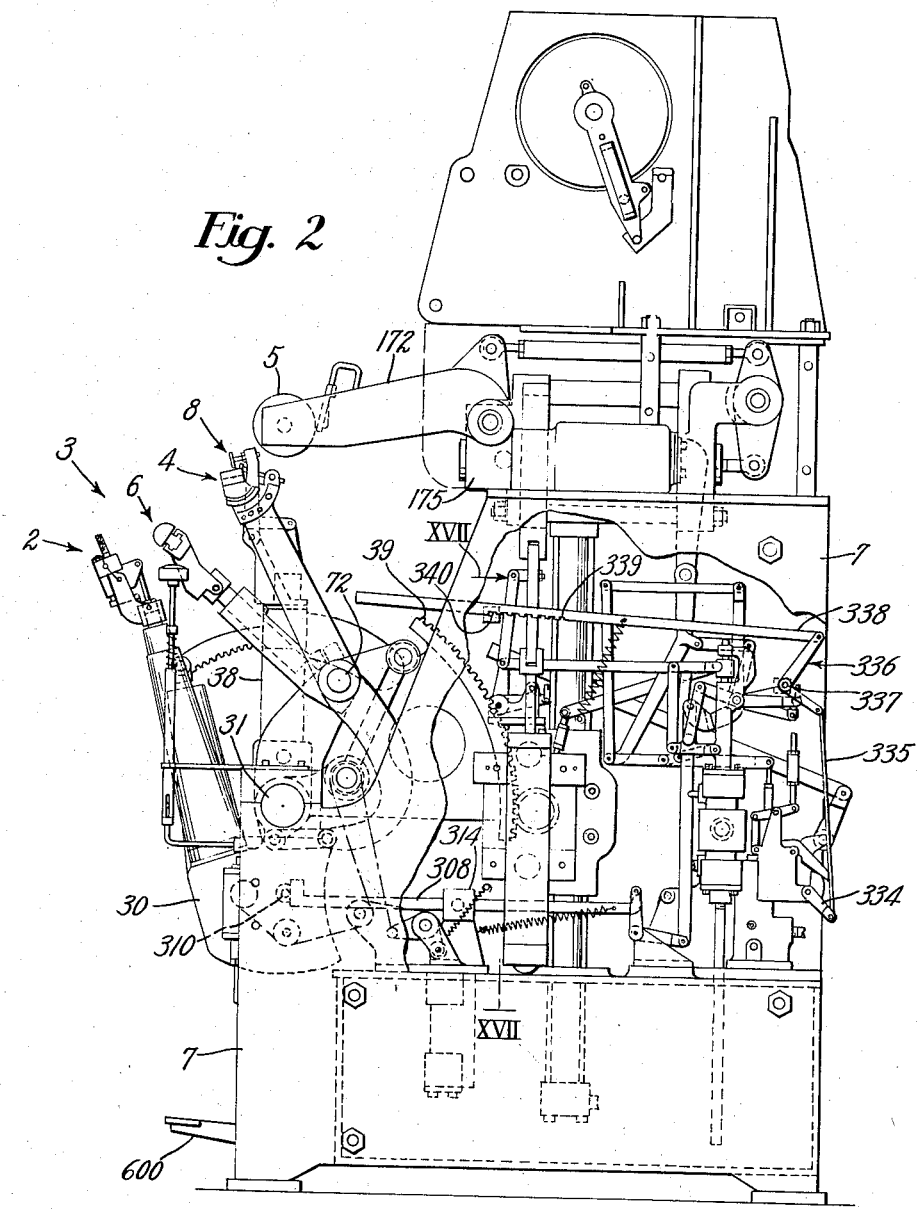
Fig. 2 is a right side elevation of the machine with the side frame partially broken away.

The machine includes a main frame 7 in which is journaled a transversely extending shaft 31. The shaft 31 carries a pair of shoe supporting jacks 3 in side-by-side relation. Each of these jacks is adapted to support a shoe in inverted position to be operated upon by an associated leveling roll 5 in response to movements of the jacks in directions lengthwise of the shoe, there being mechanism to be described for automatically moving the jacks in unison to carry the shoes rearwardly and forwardly beneath the rolls and mechanism for imparting tipping movements to the rolls in accordance with a predetermined cycle of operations.

As illustrated in Fig. 3, each of the jacks comprises a heel support 2, a toe support 4, a cone support 6, and a toe gage 8 which are arranged to be adjusted relatively to each other in directions lengthwise of the shoe automatically according to the size of the shoes to be supported thereby. The heel support 2 is carried on a swingable bracket 30 journaled on the shaft 31, the bracket 30 extending widthwise of the machine and providing the support for the heel supports of both jacks. The toe support 4 and the cone support 6 are both mounted for swinging movements lengthwise of the shoe on a shaft 72 journaled in a bracket 73 which in turn is journaled on the shaft 31. The toe gage 8 of each jack is mounted on the upper end of a centrally disposed post 38 which also is journaled on the shaft 31 and which has secured thereto the bracket 73. The post 38 has formed on a rearward extension thereof a gear segment 39 (Fig. 6) by which both jacks are moved in unison in forward and rearward directions under the rolls 5. The heel, toe, and cone supports are interconnected in such manner that rearward movement of the heel support relative to the toe gage 8 also causes proportional and relative movements of the toe and the cone supports so that the three supports are caused to assume predetermined positions relatively to each other for supporting any size of shoe presented to the jacks. Thus, by placing a pair of shoes on the heel supports 2 and thereafter moving the shoes rearwardly until the toe ends thereof engage the toe gage, the heel, toe, and cone supports are automatically caused to be moved proportionally to each other to assume predetermined positions according to the size of shoes then being placed on the jacks. Provision is also made for locking the heel support 2 to the post 38 after the toe end of the shoe contacts the toe gage in such manner that the supports become fixed against movement relative to each other and thereafter move together as a unit when the jacks are subsequently moved back and forth under the leveling rolls.

The heel support 2 comprises a spindle 10 and a supporting button 12 both carried by a member 14 mounted for swinging movements about a horizontal pin 15. The pin 15 is carried in the upper end of a forked member 17 having a hollow stem 18 mounted for heightwise sliding movements in a post 19. The post 19 is provided with a key 20 (Fig. 4) engaging a slot 21 in the stem to prevent rotation of the stem and the heel support 2. The post 19 is secured to a forwardly extending portion of the swinging bracket 30 which is arranged to swing about the horizontal bearing shaft 31 journaled in the side frames of the machine. For determining the heightwise position of the heel end support according to the size of shoe to be operated upon, a multi-armed lever 32 is provided with an extension 33 arranged to engage the lower end of the stem 18, the lever 32 being mounted to swing about a pin 34 journaled in the bracket 30. An arm 35 of the lever 32 is connected by a link 36 to an arm 37 of the toe gage carrying post 38 which is also mounted for swinging movements on the bearing shaft 31. The post 38 has formed thereon the gear segment 39 which engages a gear 40. As will be subsequently described, the gear 40 is held stationary while the shoe is being jacked so that the post 38 and its arm 37 are also held stationary.

To adjust the jacks prior to the leveling operation the operator places the heel end of an inverted shoe on the heel support with the thimble of the shoe last on the spindle 10 and with the last resting on the button 12 and thereafter moves the heel support with the shoe thereon rearwardly toward the toe gage 8 which is adapted to determine the lengthwise position of the toe end of the shoe. Accordingly, it may be seen that the heel rest when carrying a small size shoe must travel farther before the toe end of the shoe engages the toe gage 8 than when carrying a large size shoe. As the bracket 30 is swung clockwise as seen in Fig. 4 about its bearing shaft 31 when a shoe on the heel support is being moved toward the toe gage, the lever 32 will be caused to swing clockwise relatively to the bracket 30 by reason of its connection through the link 36 to the arm 37 which at this time is stationary, the supporting pin 34 moving with the bracket 30, thereby causing the extension 33 to raise the stem 18 and with it the heel support. It may be seen that the farther the heel support is swung rearwardly, according to the size of shoe, the higher the heel support is raised by the lever 32. In this manner the bottom of any size shoe on the jack is presented to the leveling roll in a predetermined heightwise plane regardless of shoe size.

For swinging the member 14 about its pivot 15 so that the toe end of the shoe is forced firmly against the toe support 4, the member 14 is provided with an arm 16 having pivotally connected thereto a rod 46 which, at its lower end, is connected by a member 47 (Fig. 4) slidable in the upper end of the stem 18 to a rod 48 extending downwardly within the stem. The member 14 with the last pin 10 is normally held in a last receiving position by a spring 49 confined between the lower end of the connecting member 47 and a washer 50 surrounding the rod 48 and held in a fixed positon relatively to the stem 18 by a pin 51, there being cooperating surfaces 52 and 53 on the members 14 and 17 to limit counterclockwise movement of the member 14. The lower end of the rod 48 has secured thereto a chain 56 which passes over a pair of sprockets 54 carried by the lever 32, a sprocket 55 mounted on a bracket 64 fixed to the machine frame, a sprocket 65 on a pin 66 in the bracket 30, and thereafter is connected to one arm of a bell crank 57 by means of an adjustable link 58. A light spring 63 attached to the other arm of the bell crank urges the bell crank in a counterclockwise direction as seen in Fig. 5 to the dash line position illustrated therein, the arm also carrying a roll 59 arranged to be engaged by a head 60 of a piston 61 in a cylinder B. A spring 62 in the cylinder B urges the piston 61 downwardly to the position illustrated in Fig. 5 with the machine at rest. As the heel support 2 is moved upwardly, during its rearward movement toward the toe gage, the rod 48 is moved with it causing the bell crank 57 to be swung clockwise by the chain 56 against the action of the spring 63. Thus, as the heightwise position of the heel support is varied according to the size of the shoe to be operated upon, the position of the bell crank 57 and its roll 59 is also varied, as may be seen by a comparison of the dash line and full line positions of the bell crank 57 in Fig. 5. The full line position of the bell crank 57 in Fig. 5 is established by the heel support movement for the smallest size shoe to be operated upon, while a larger size shoe would cause the bell crank generally to assume the position shown in dash lines. As the piston 61 is moved upwardly in a manner subsequently to be described, the head 60 of the piston engages the roll 59 of the bell crank in different heightwise positions depending on the size of shoe. Accordingly, the force exerted by the piston 61 on the bell crank 57 is effective to tilt the spindle 10 through a smaller moment arm for a small size shoe than for a large size shoe, and therefore the effective force tilting the heel end support 2 is greater for a large size shoe than it is for a small shoe. When the heel support is locked to the post 38 in a manner subsequently to be described the position of the lever 32 is fixed relative to the bracket 30 and hence the lower sprocket 54 and the sprocket 65 will thereafter oscillate together bodily about the shaft 31 during the leveling movement of the jacks. Due to the arrangement of the sprockets 54 and 65 at opposed sides of the sprocket 55 any bodily movement of the lower sprocket 54 relative to the sprocket 55 results in an opposite bodily movement of the sprocket 65 relative to the sprocket 55, the movement of the sprocket 65 being approximately one-half that of the sprocket 54. The movement of the sprocket 65, however, acts with double effectiveness on the chain 56 since the chain is doubled over this sprocket. Due to this arrangement only a negligible amount of motion is imparted to the bell crank 57 by movement of the jacks during the leveling cycle of the machine, thus avoiding undesirable variation of the effective force tilting the spindle after the jack has been set for size.

The toe support 4 comprises a toe pad 70 mounted on the upper end of an arm 71 which is mounted for swinging movements lengthwise of the shoe about the bearing shaft 72. As seen in Fig. 3, the arm 71 is inclined toward the heel support and away from a vertical position. Thus it may be seen that as the arm 71 is swung about the shaft 72 and toward a vertical position, the toe pad 70 is moved in an arc which extends heightwise as well as lengthwise of a shoe resting on the pad so as to present the bottom of the forepart of any size shoe supported thereon in a predetermined heightwise plane. The shaft 72 is carried in the bracket 73 journaled on the bearing shaft 31 and fixed to the toe gage post 38 by means of a screw 74. Since the post 38 is stationary during jacking of the shoe, the bracket 73 and hence the shaft 72 are also stationary. A downwardly extending arm 75 integral with the arm 71 is connected by a link 76 to the bracket 30 by means of a stud 77 on the bracket 30. Thus, as the bracket 30 is swung clockwise with the heel support 2, the arm 71 and hence the toe pad 70 are also caused to swing clockwise and heightwise about the shaft 72, the swinging movement of the arm 71 being less than, but proportional to, the swinging movement of the heel support. In this manner the heightwise position of the toe support 4 and the distance between the heel support 2 and the toe support are varied according to the size of shoe being operated upon so that regardless of its size, the shoe will be supported by the toe pad in the same relative position lengthwise of the shoe, and the bottom of the forepart of the shoe will be positioned in a predetermined heightwise plane relative to the leveling roll.

To determine the lengthwise position of the shoes on the jacks the toe gages 8 are provided. These gages comprise headed screws 80 (Figs. 6 and 7) arranged to be engaged by the toe ends of the shoes. One of the screws 80 is adjustably mounted in the upper end of an arm 81, while the other screw is mounted in an arm 104 (Fig. 7), both arms being fixed to a shaft 82 mounted for rotation in a bracket 83 carried on the upper end of the post 38. The arm 81 is adjustably connected to a plate 90 by means of a screw 84 carried by a block 86 mounted on the arm 81, the end of the screw 84 being threaded through a pin 88 carried by the plate 90. A latch 91, also pivotally carried by the plate 90, is adapted to be received in a notch 92 formed in an upstanding portion 93 of an arm 94, the latch 91 being yieldingly held in the notch 92 by a spring 89 which extends from the latch to a pin in a plate 101 fixed to the bracket 83. The arm 94 is connected by a depending link 95 to one end of a lever 96 (Fig. 6) pivotally mounted on a pin 97 carried by a bracket 98 which is secured to the upper end of the casing of a valve A. The opposite end of the lever 96 is pivotally connected by an adjustable link 99 to the upper end of a piston 100 (Fig. 9) of the valve A. The upper portion of the piston 100, together with a portion 102 of reduced diameter forms a valve spool which, in the position shown in Fig. 9, prevents communication between a pipe 110 and a pipe 111. The position of the piston 100 at this time also allows communication between the pipe 111 and an exhaust pipe 112 around the reduced portion 102. A torsion spring 103 (Fig. 7), secured at one end to the bracket 83 and at the other end to the arm 104, causes both the shaft 82 and the arm 81 to be rotated counterclockwise, as seen in Fig. 7, until the lower end of the piston 100 comes to a stop position in the lower end of the valve A. Thus, as the shoes on the jacks are moved rearwardly by the operator, the toe ends of the shoes engage the stop screws 80 and cause the arm 81 to be swung clockwise, as seen in Fig. 3, moving the piston 100 up in the valve A. As shown in Fig. 7, the arm 81 at this time is effectively connected to the arm 94 through the latch 91. Upward movement of the piston 100 closes off the exhaust pipe 112 and allows communication between the pipe 110 and the pipe 111 through the reduced portion 102 of the piston. Communication between the pipes 110 and 111, in a manner subsequently to be described, causes the heel support to be locked to the toe gage post 38, thereby also fixing the position of the toe support.

During subsequent operation of the machine in a manner to be explained, fluid under pressure is admitted to a chamber 116 of the valve A causing the piston 100 to be moved upwardly. Heightwise movement of the piston causes the arm 81 to be swung rearwardly and downwardly to a position below the level of the shoe bottom. In this manner, after the jacks are adjusted the toe gages are caused to assume positions where they will not interfere with the levelling rolls 5 while the shoes are automatically moved back and forth under the rolls during the leveling operation. Near the end of the rearward movement of the arms 81, 104 the latch 91 is swung up out of the notch 92 by engagement of the latch with a cam surface 105 of the fixed plate 101. After disengagement with the notch, the latch engages a shoulder 106 beyond the cam surface 105, thereby effectively latching the toe gages in retracted position while allowing the toe gage piston parts to return to initial positions without interference from the toe gages during subsequent operation of the machine as will be described.

The cone support 6 comprises a pad 134 carried for lateral adjustment by means of a T-shaped connection 135 in the upper end of a member 136. The member 136 is carried by a stem 137 which is received for heightwise sliding movements in a bore 146 in an arm 138. A spring 133 confined at its upper end in a bore 132 in the stem 137 and confined at its lower end by a flange on a piston 140 urges the member 136 and the cone support heightwise so that the cone support yieldingly engages the cone portion of the shoe last. The arm 138 is mounted for swinging movements about the bearing shaft 72 and has formed integral therewith a rearwardly extending arm 139. The arm 139 is connected to the bracket 30 by a link 143, the link being secured to the bracket by the pin 66. Thus, as the bracket 30 is swung clockwise with the heel support 2, the arm 138 and the cone support 6 are also caused to swing clockwise about the bearing shaft 72. The piston 140 is received at its lower end in a bore 145 in the arm 138, the bore 145 forming a cylinder connected to a pipe 142 by means of a passageway 141 in the arm 139. At the proper time in the cycle of the machine, fluid under pressure is admitted to the bore 145 thus raising the piston 140 until it engages the lower end of the stem 137 as shown in Fig. 3. In this manner a predetermined supporting force is applied through the piston 140 to the cone of the shoe regardless of the heightwise position of the cone support.

From the foregoing description of the various elements of the jack mechanisms it is obvious that by connection with the bracket 30, of the heel rest mechanism, the size adjusting movements of the toe support and the cone support are dependent upon the movement of the heel rest relative to the toe gage. Referring to Fig. 3, it appears that upon movement of the heel rest toward the toe gage 8 that the toe rest is also moved toward the gage to a lesser degree by means of the connection of the arm 75 of the toe rest mechanism to the bracket 30 by the link 76. The bracket 30 swings about the shaft 31 while the arms 71 and 75 swing about the shaft 72. At the same time, movement of the bracket 30 also causes a proportional movement of the cone support 6 toward the gage 8 by means of the connection of the arm 139 of the cone support mechanism to the bracket 30 by the link 143. The lengths of the interconnected lever arms above described are carefully proportioned so that movement of the heel rest relative to the toe gage causes the heel support, the toe support, and the cone support to be moved relatively to each other and to the toe gage in proportional degrees, depending upon the size shoe to be operated upon, so that, regardless of the size shoe, the shoe supporting members are properly positioned to support any size shoes placed on the jacks.

For locking the heel support, the cone support, and the toe support against relative movement after the toe gage is actuated, the bracket 30 is provided with an upstanding post 120 (Fig. 6) which at its upper end is pivotally connected to an arcuate bar 124 by means of a forked pin 122 secured to the post. The bar 124 has serrations 125 in its lower edge and is guided for arcuate sliding movements in a slot 126 (Figs. 8 and 10) in a member 127 received in a bore 131 in the toe gage carrying post 38. A piston 128 is also received in the bore 131 below the bar 124, the upper end of the piston 128 having serrations 129 arranged to engage the serrations in the bar. A spring 130 is arranged normally to urge the member 127 downwardly, and since the lower end of the member 127 engages a portion of the piston 128, the spring also urges the piston downwardly out of engagement with the bar 124. The lower end of the bore 131 is in communication with the pipe 111 so that, as fluid under pressure is allowed to pass from the pipe 110 to the pipe 111 through the valve A when the toe ends of the shoes contact the toe gages, the piston 128 is moved up against the action of the spring 130 to engage the serrations 125 on the lower side of the bar 124, thus locking the bracket 30 to the post 38. Locking the position of the bracket 30 also fixes the relative positions of the heel support, the toe support, and the cone support.

For moving the jacks in forward and rearward directions so that the bottoms of the shoes carried thereby are moved back and forth under the leveling rolls, the gear segment 39 of the toe gage carrying post 38 is arranged to be oscillated by the gear 40 (Fig. 12). The gear 40 is mounted for rotation in a casing 150 which is secured to two bars 151 extending between and fixed to the side frames of the machine. A vertical rack bar 154 is mounted for heightwise reciprocations to rotate the gear 40 at the proper time and has formed at its opposite ends pistons 155 and 156 movable in coaxial cylinders 157 and 158, respectively. The rack bar 154 is supported against movement away from the gear 40 by two antifriction rolls 153 mounted for rotation in the casing 150. The cylinder 157 has a lower end cap 160 which is secured to the cylinder by means of rods 162 threaded into the casing 150 and having nuts 159 engaging the cap. The cap 160 has threaded thereinto a pipe 163 and provides communication from the pipe to the lower end of the cylinder 157. The cylinder 158 is provided with an upper end cap 161 mounted in a manner similar to the cap 160 and has threaded thereinto a pipe 164 which supplies fluid through the cap to the upper end of the cylinder 158. At the appropriate time, in a manner subsequently to be described, fluid under pressure is admitted to the cylinder 157 through the pipe 163 to raise the rack bar 154, causing the gear 40 to rotate counterclockwise. Counterclockwise rotation of the gear 40 causes the segment 39, and hence also the jacks, to be swung clockwise about the bearing shaft 31, thus moving the shoes rearwardly into the machine and under the leveling rolls. At appropriate times fluid under pressure is admitted alternately to the cylinders 157 and 158 to reciprocate the rack bar 154, causing the shoes on the jacks to be moved back and forth under the rolls 5.

Figure 19:
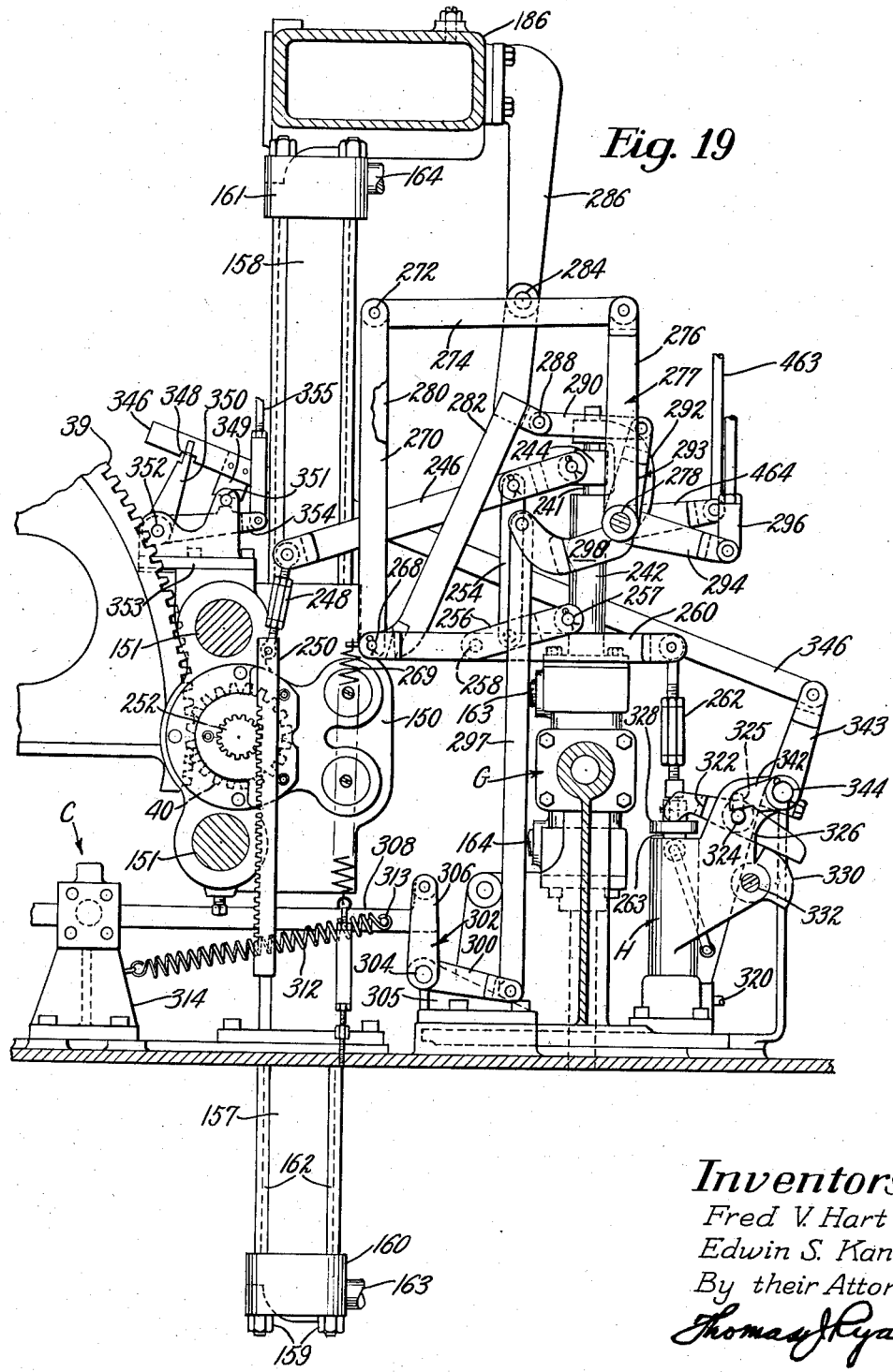
Fig. 19 is a side elevation of the jack operating control mechanism.
Figure 20:
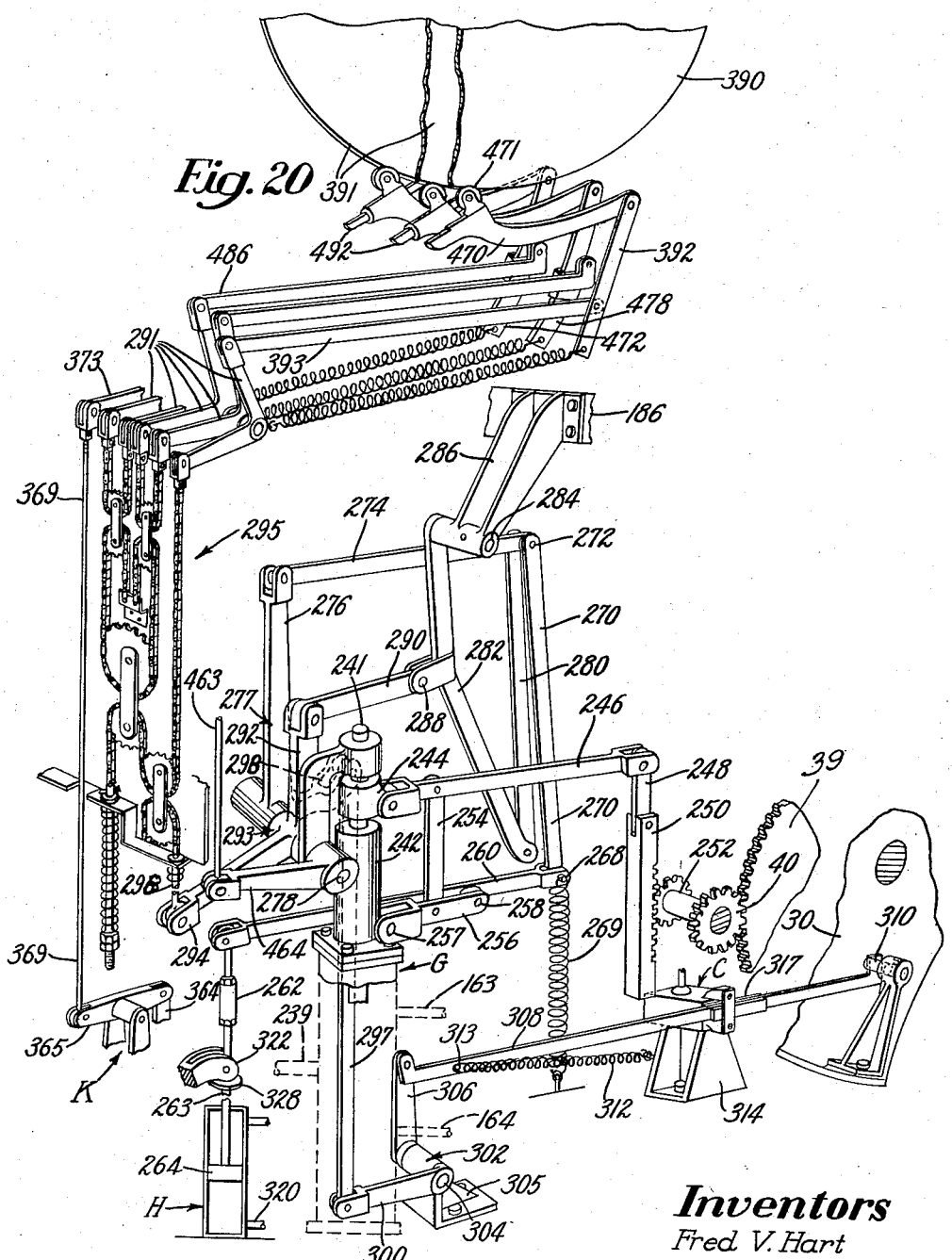
Fig. 20 is a diagrammatic perspective view of the jack operating control mechanism.

For controlling the admission of fluid under pressure into the cylinders 157, 158 the pipes 163, 164 are connected at their opposite ends to the casing of a valve G (Figs. 19 and 20). The valve G is provided with a spool 240 shown only in Fig. 41 which controls communication between the pipes 163, 164, and a pipe 239, through which fluid under pressure is supplied from a pump P. The spool 240 is provided with a stem 241 (Figs. 19 and 20) which extends upwardly through a bracket 242 secured to the casing of the valve G and has fixed thereto a collar 244. The collar 244 is pivotally connected to one end of a lever 46 which, at its opposite end, is connected by a link 248 to a rack bar 250. The rack bar is arranged to be moved by a pinion 252 integral with the gear 40 so that when rotation is imparted to the gear 40 by heightwise movement of the rack bar 154 a proportional movement is also imparted to the rack bar 250. The lever 246 is also pivotally connected between its ends by a link 254 to a lever 256 which is pivoted at 257 to the bracket 242. The opposite end of the lever 256 is pivotally connected at 258 to another lever 260 which is connected at one end by an adjustable link 262 to a stem 263 of a piston 264 in a cylinder H. The opposite end of the lever 260 is connected by a pin 268 to the lower end of a link 270 which, at its upper end, is carried on a pin 272 in one end of an arm 274. To counteract any backlash which may exist in any of the above described connections, a spring 269 extending from the pin 268 to the machine base applies a tension in one direction to the connections. The arm 274 at its opposite end is carried by an upstanding arm 276 of a bell crank 277 fixed on a shaft 278 journaled in the bracket 242. The pin 272 in the arm 274 also carries another depending link 280 which, at its lower end, is connected to a lever 282 pivotally mounted at its upper end on a pin 284 carried by a bracket 286 secured to a member 186. The lever 282 also is connected at 288 by a link 290 to an upstanding arm 292 of a bell crank 293 also journaled on the shaft 278. For swinging the bell crank 293 to impart a heightwise movement to the spool 240 of the valve G through the foregoing mechanism an arm 294 of the bell crank 293 is connected to a group of cam operated bell cranks 291 through a differential mechanism 295 by an adjustable link 296. Each one of the group of bell cranks 291 is operated by an individual cam designed to control movement of the jacks to level a specific portion of the shoe bottom as will be hereinafter described. Thus, as motion is imparted to the bell crank 293 by any one of the above cams, acting through the differential 295, the lever 282 is caused to swing about the pin 284 thereby imparting a heightwise component of movement to the arm 274 through the link 280. The arm 274 is thus caused to swing heightwise on the arm 276 of the bell crank 277 and through the link 270 imparts a heightwise movement to the lever 260 which at this time pivots on the link 262. Heightwise swinging of the lever 260 acting through the lever 256 and the link 254 imparts a heightwise movement to the lever 246 which at this time pivots on the link 248. Heightwise movement of the lever 246 causes the stem 241 and the valve spool 240 to be moved heightwise to admit fluid under pressure to one of the pipes 163, 164 from the pipe 239 through the valve G, thus causing the rack bar 154 to be moved heightwise in the cylinders 157, 158 and thus impart a corresponding forward or rearward movement to the jack. If the above cams cause the spool 240 to be moved upwardly in the valve G, fluid under pressure is admitted to the lower cylinder 157 through the pipe 163 to raise the rack bar 154 causing the jacks to be moved rearwardly under the leveling rolls, the fluid in the cylinder 158 at this time being allowed to exhaust through the pipe 164 and the valve G. As the jacks are moved rearwardly the rack bar 250 is moved up by the pinion 252 causing the lever 246 to pivot on the link 254 and lower the valve spool 240 until communication to the lower cylinder 157 is closed off, thus stopping the motion of the jack. In this manner the jacks are caused precisely to follow the rise and fall of the jack control cams, the above described valve operating mechanism acting as a servo control mechanism. It may also be seen that downward movement of the valve spool causes the jacks to be moved forwardly under the leveling rolls. Thus, it may be seen that by proper design of the configuration of the above cams, the jacks are moved forwardly and rearwardly under the leveling rolls in a predetermined cam-controlled sequence properly to level the bottom of the shoe.

For operating on shoes of various sizes the sequence of the jack motions may be the same but the amount of jack motion allotted to each portion of the shoe bottom must be varied proportionately according to the size of the shoes being operated upon. For this purpose the other arm 298 (Fig. 20) of the bell crank 277 is connected by a depending link 297 to one arm 300 of a bell crank 302 arranged to swing about a pin 304 carried by a bracket 305 secured to a portion of the machine frame. The other arm 306 of the bell crank 302 is pivotally connected to a forwardly extending pantograph bar 308 which, at its forward end, engages a pin 310 (Figs. 6 and 20) in the jack bracket 30. A spring 312 which extends from a pin 313 in the bar to a bracket 314 secured to the frame of the machine, urges the bar 308 forwardly against the pin 310. Thus the position of the pin 310 determines the position of the bell cranks 302 and 277, thus also determining the position of the pin 272 connecting the links 270, 280 to the arm 274 relative to the pivot pin 284 of the lever 282. As the initial position of the jacks is varied according to the size of shoes to be operated upon, as previously described, so also is the position of the pin 310 on the bracket 30 varied according to the shoe size. In this manner, the relative distance between the pin 272 and the pivot point 284 of the lever 282 is varied according to the shoe size. As may be seen in Figs. 19 and 20, the heightwise component of movement imparted to the arm 274 by the lever 282 through the link 280 is dependent on the distance between the pin 272 of the lever 274 and the pivot point 284 of the lever 282. Thus, as the pin 272 is moved closer to the pin 284 the heightwise motion imparted to the arm 274 through the link 280 is less than if the positions of the pin 272 and the pivot 284 are farther apart. For a small size shoe the pin 272 is moved closer to the pivot pin 284 than it is for a large size shoe, resulting in a small heightwise movement being imparted to the lever 260 through the link 270, also resulting in a smaller heightwise movement being imparted to the spool 240 of the valve G, and accordingly also resulting in a proportionally smaller movement of the jacks.

Figure 24:
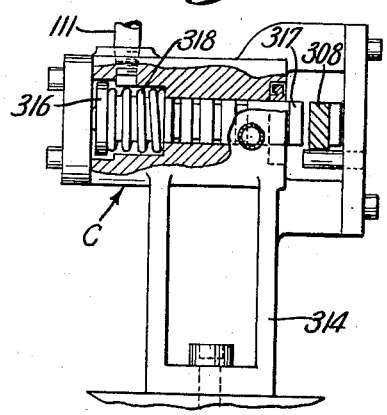
Fig. 24 is a section on line XXIV—XXIV of Fig. 6.

For fixing the relative position between the pin 272 and the pivot 284 of the lever 282 after adjustment thereof according to the size of shoes on the jacks, the bracket 314 is provided with a guideway which receives the bar 308. Formed in the bracket 314 adjacent the slideway thereof is a cylinder C having a piston 316 (Figs. 24 and 41) which carries a friction member 317 adapted to engage the bar 308. A spring 318 in the cylinder C acts on the piston 316 to urge the friction member out of engagement with the bar 308 so the bar is normally free to slide relatively to the bracket 314. As previously described, actuation of the arm 81 by the toe of the shoe on the jack causes fluid under pressure to be admitted to the pipe 111 from the pipe 110 through the valve A causing the jack to be locked and the last pin 10 to be tilted. The pipe 111 is also connected to the cylinder C so that when the toe gage is actuated, fluid pressure is also admitted to the cylinder C to cause the friction member 317 to engage the bar 308 preventing further movement thereof. In this manner, after adjustment of the mechanism controlling the amount of movement of the spool 240 of the valve G according to the size of the shoe, this adjustment becomes fixed during subsequent movement of the jacks so that the bar 308 cannot subsequently follow the motion of the pin 310 on the jack bracket 30.

Figure 23:
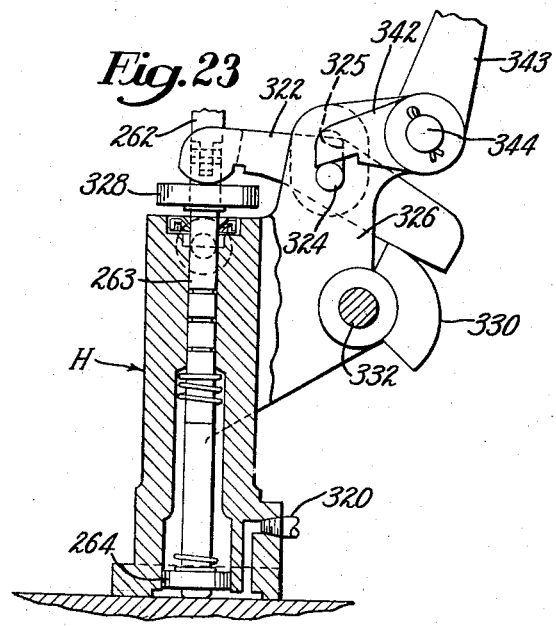
Fig. 23 is a vertical section through a valve actuating cylinder for controlling initial movement of the shoe support.

At times it becomes desirable, after the leveling operation, manually to pound the forepart bottom of the shoe, and for this purpose the toe ends of the shoes on the jacks must be spaced forwardly from the leveling rolls at the end of the leveling operation while the shoes are still supported on the jacks. Accordingly, when another pair of shoes is placed on the jacks, the jacks must be initially moved rearwardly so the toe ends of the shoes are in proper positions to be engaged by the rolls when the leveling operation commences. To this end and prior to the motion imparted to the jacks through the jack control cams, fluid is admitted through a pipe 320 (Figs. 20 and 41) to the cylinder H to raise the piston 264 causing the lever 260 to be swung heightwise about the pin 268. The heightwise motion thus imparted to the lever 260 causes the valve spool 240 of the valve G to be raised a predetermined amount as will be explained, resulting in a rearward movement of the jacks until a corresponding heightwise movement of the rack 250 causes the jack to stop. It is essential in the leveling of shoe bottoms that the leveling rolls commence the application of pressure to the shoe bottoms at a point close to the toe end of the shoe. When operating on men's shoes which have a substantially flat bottom, the toe ends of the shoes on the jacks are initially positioned directly under the center of the leveling rolls. However, when operating on women's shoes, the bottoms thereof are inclined heightwise when presented to the leveling rolls, whereas the bottoms of men's shoes are presented to the rolls in a substantially horizontal plane. Thus, if the toe ends of women's shoes were initially positioned under the center of the rolls, when the rolls were lowered to engage the shoe bottoms, the rolls would initially contact the shoe bottom tangent thereto and somewhat heelwardly of the proper position at the toe end, resulting in improper leveling of such shoes. Accordingly, when operating on women's shoes, the initial movement of the jacks caused by movement of the piston 264 must be less than when operating on men's shoes so that the rolls initially engage the shoe bottom at the proper point near the toe end of the shoe. To this end a lever 322 (Figs. 19 and 23) carrying a pin 324 riding in slots 325 in a bifurcated extension 326 of the casing of the cylinder H is adapted to limit the heightwise movement of the piston 264 by engaging a flange 328 on the stem 263 of the piston. The opposite end of the lever 322 rests on a cam member 330 fixed to a shaft 332 also journaled in the extension 326 and in another extension 327 to be described. As the fluid pressure admitted to the cylinder H causes the piston 264 to rise, the flange 328 on the stem of the piston causes the lever 322 to be moved heightwise by rocking on the cam 330. The piston 264 is moved heightwise until the pin 324 in the lever 322 engages the upper end of the slots 325 preventing further movement of the piston. Since the cam 330 determines the heightwise position of one end of the lever 322, the position of the cam 330 also determines the distance that the lever 322 and the piston 264 can be moved before the pin 324 contacts the upper ends of the slots 325, thus also determining the initial displacement of the valve 240 to vary the rearward position of the jacks before they are caused to be actuated by the control cams. For adjusting the position of the cam 330 to vary the initial movement of the jacks, the shaft 332 has fixed thereto an arm 334 (Fig. 17) pivotally connected by a rod 335 to one arm of a bell crank 336 journaled on a pin 337 in the frame of the machine. The other arm of the bell crank is pivotally connected to a forwardly extending bar 338 having notches 339 adapted to engage a pin 340 in the frame. By varying the lengthwise position of the bar 338, as determined by the notches 339, the position of the cam 330 is also varied.

To initiate the operation of the control cams, an arm 342 (Fig. 19) fixed to a shaft 344 journaled in the extension 326 is adapted to be swung heightwise about the shaft by the upward movement of the pin 324. Another arm 343 also fixed to the shaft 344 is pivotally connected to a forwardly inclined bar 346 having at its forward end a notch 348 which engages an upstanding arm 350 fixed to a shaft 352 journaled in a bracket 353 carried on the casing 150. Another arm 354 also fixed to the shaft 352 is pivotally connected by an upwardly extending rod 355 in a manner subsequently to be described to a clutch mechanism which controls rotation of the control cams. Thus, as the arm 342 is raised by upward movement of the pin 324 the clutch mechanism is caused to be actuated near the end of such movement through the bar 346 and arms 350 and 354 to initiate the cam controlled portion of the leveling cycle of the machine. The bar 346 adjacent the notch 348 has fixed thereto a cam plate 349 (Figs. 19 and 38), the lower end of which rides on a fixed pin 351. Thus, as the bar 346 is moved rearwardly to actuate the clutch mechanism, the cam plate 349 raises the end of the bar 346 until the notch 348 is disengaged from the arm 350, thus releasing the arm 350 so the clutch mechanism may function subsequently without interference from the bar 346.

Figure 22:
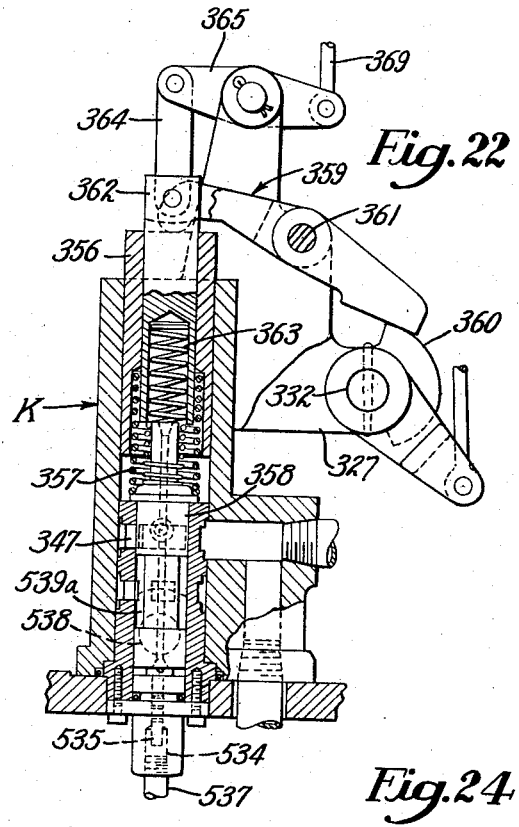
Fig. 22 is a vertical section through the roll pressure relief valve.

Each leveling roll 5 is mounted for rotary and axial movement on a shaft 170 (Figs. 14 and 15) carried in the opposite ends of a C-shaped member 171. Two springs 168 on the shaft 170 and bearing against opposite ends of the roll not only tend to centralize the roll but also to allow axial movement thereof when the roll engages a shoe bottom. The member 171 is carried in the forward end of a holder 172 in such manner that the axis of the shaft 170 may be swung in a horizontal plane, the member 171 being secured to the holder in adjusted position by a screw 169. The holder 172 is mounted for heightwise swinging movements about a shaft 173 fixed in a carrier 175 (see also Fig. 16). The carrier 175 has rigidly secured thereto by two bars 182 and nuts 184 a bracket 180, the bracket and the carrier being mounted for tipping movements laterally of the machine on the outer races of ball bearings 174. The inner races of the bearings 174 are carried by and are secured to a cylinder 177 by two nuts 176 threaded on opposite ends of the cylinder. The cylinder 177 is carried in a forwardly and rearwardly extending bore 185 in a carrying member 186 which extends between the side frames of the machine, the cylinder being fixed against axial movement in the bore by a screw 187. The holder 172 has an upwardly extending arm 190 which is pivotally connected by an adjustable link 192 to the upper arm of a lever 194 pivotally mounted at 196 to a forked portion 181 of the bracket 180. The lower arm of the lever 194 is pivotally connected by a rod 198 to a piston 200 in the cylinder 177, the rod 198 being connected to the piston by a ball connection 202. A spring 204 confined between an end cap 206 of the cylinder 177 and the piston 200 moves the piston to the left, as seen in Fig. 14 and, through the rod 198, raises the roll 5 until the piston 200 engages an end cap 208 of the cylinder. For causing the leveling rolls to be moved down into engagement with the bottoms of the shoes being carried forward and rearward under the rolls by the jacks, fluid under pressure is admitted to the cylinders 177 through the end caps 208 from a pipe 209, causing the pistons 200 to move to the right as seen in Fig. 14. Movement of the pistons acting through the above mechanism causes the leveling rolls 5 to be moved downward until they either engage the bottoms of the shoes underlying the rolls or until the upper arms of the levers 194 engage stop screws 207 in the brackets 180. Admission of fluid under pressure to the cylinders 177 through the pipe 209 is controlled by a solenoid operated valve J (Fig. 42) which is energized to allow fluid to flow from a pump P1 to the pipe 209 simultaneously with actuation of the clutch mechanism. To control the pressure applied to the shoe bottom by the rolls 5 the pressure of the fluid supplied by the pump to the pipe 209 is controlled by a pressure relief valve K (see also Fig. 22). To adjust the pressure supplied to the cylinders 177, the valve K is provided with a sleeve 356 which receives the upper end of a spring 357 contained between the sleeve and a valve element 358. The spring normally urges the valve element 358 downwardly to close off an exhaust port 347 in the valve. When the pressure of the fluid going to the cylinders 177 exceeds a value determined by the spring 357, the valve element 358 is lifted against the action of the spring 357 to bleed off the excess pressure. For varying the compression of the spring 357, thereby also varying the fluid pressure, the heightwise position of the sleeve 356 is determined by a lever 359 which at one end engages the upper end of the sleeve and at the other end engages a cam 360 mounted for rotary adjustment on the shaft 332, the lever 359 being pivoted at 361 to a bifurcated extension 327 of the cylinder K. As previously mentioned, the shaft 332 is rotated by adjustment of the bar 338 so that, as the cam 330 is adjusted to vary the starting position of the toe of the shoe, so also is the cam 360 varied to determine the roll pressure to be applied to the shoe bottoms. At times, in the leveling of shoe bottoms it also becomes desirable to vary the leveling pressure from one portion of the shoe to another. To this end the valve K is provided with another sleeve 362 which is coaxial with the sleeve 356 and which controls the compression of a spring 363 also applying a closing force to the valve element 358. By moving the sleeve 362 downwardly in the valve K, the spring 363 is further compressed so that the pressure controlled by the valve K is increased. Accordingly, upward movement of the sleeve 362 results in a lighter pressure being produced or controlled by the valve K. For moving the sleeve 362 heightwise for varying the pressure, the upper end of the sleeve is connected by a rod 364 to one end of a lever 365, the opposite end of which is connected by a rod 369 to a bell crank 373 (Fig. 32) actuated by a cam 377 coopearting with the jack control cam mechanism. Since the cam mechanism also controls the movement of the jacks, it will be understood that the pressure controlled by one of the cams may be varied according to the position of the shoes carried by the jacks under the leveling rolls.

Figure 16:
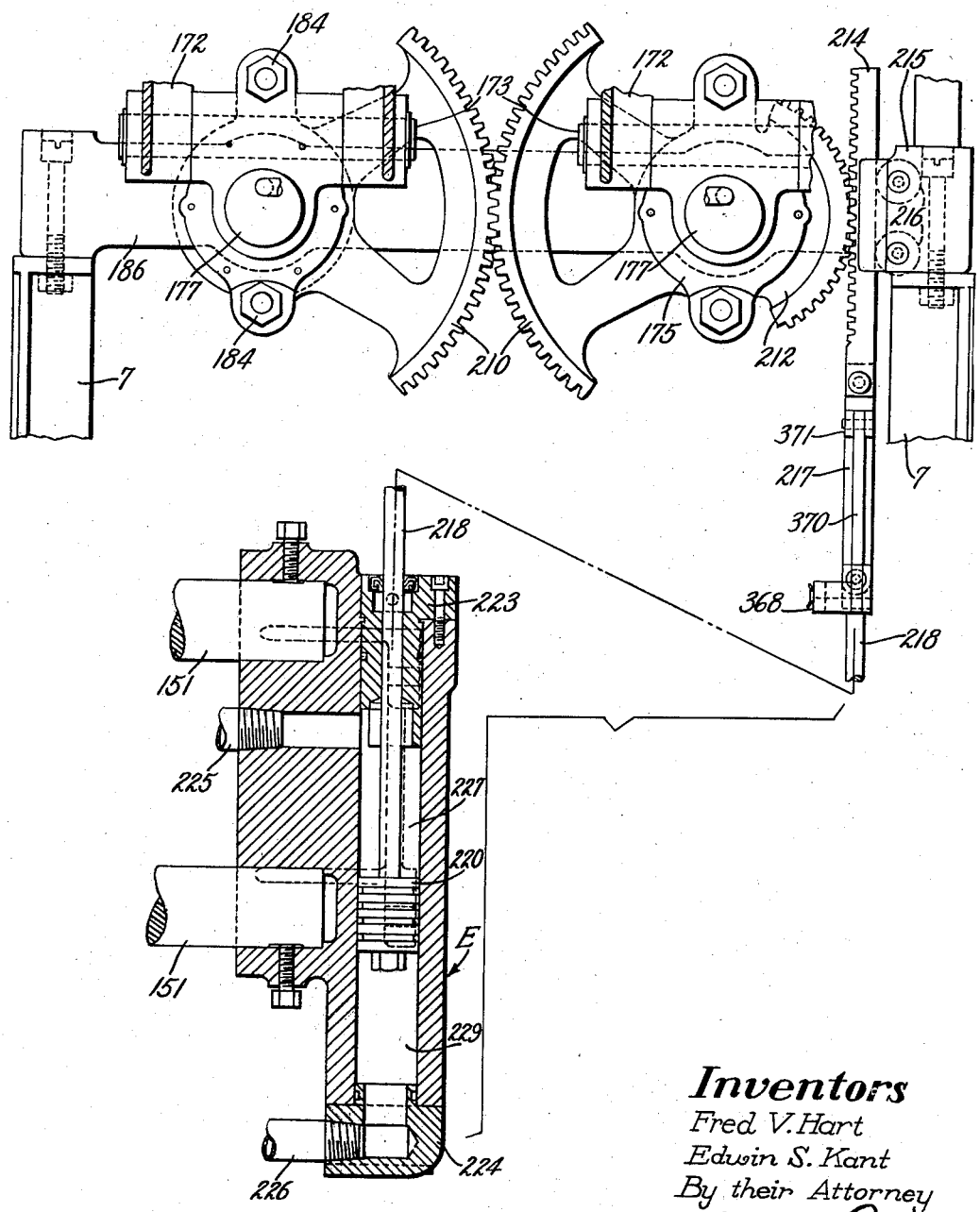
Fig. 16 is a section substantially on line XVI—XVI of Fig. 14.
Figure 21:
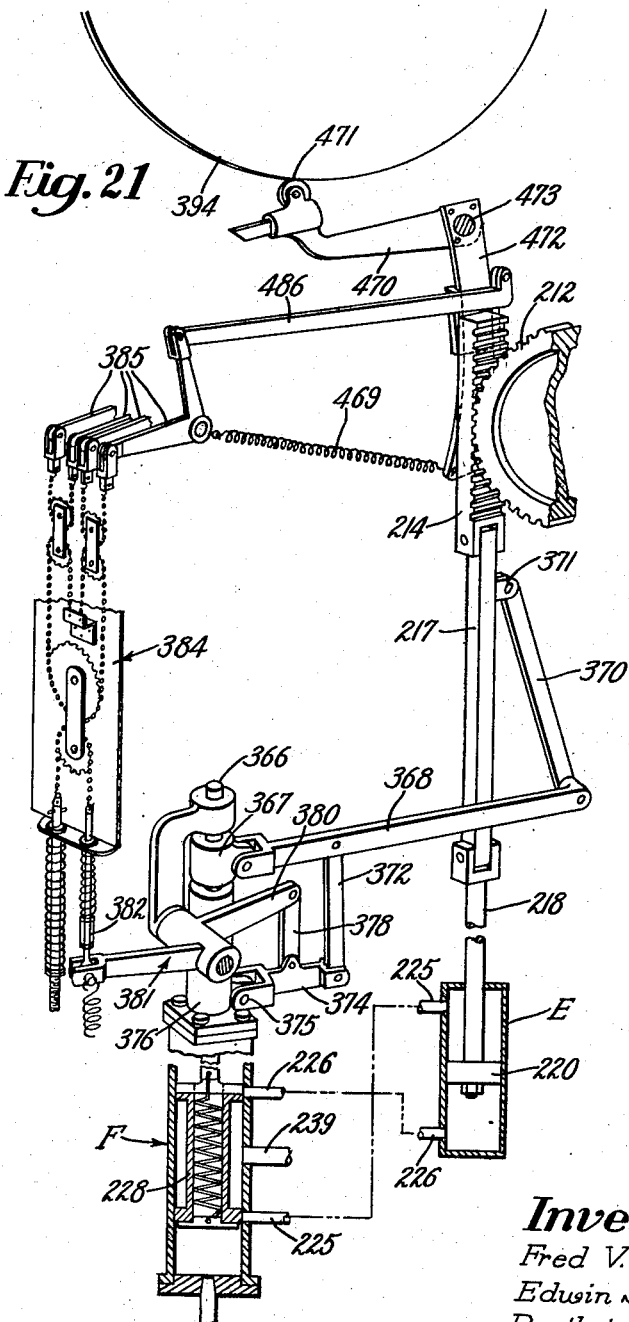
Fig. 21 is a diagrammatic perspective view of the roll tip control mechanism.

For causing the leveling rolls 5 to tip laterally of the machine about the axes of the cylinders 177, the carriers 175 have formed thereon meshing gear segments 210 (Fig. 16) so that both rolls are tipped simultaneously, but in opposite directions. The right-hand carrier 175, as seen in Fig. 16, also has formed thereon another gear segment 212 which meshes with a vertically extending rack 214 guided for heightwise movements in a bracket 215 mounted on one of the side frames 7 of the machine. A pair of rolls 216 journaled in the bracket 215 support the rack 214 against movement away from the gear segment 212. The lower end of the rack 214 is connected by a link 217 to a piston rod 218 of a piston 220 in a cylinder E. The upper end of the cylinder is closed by a cap 223 while the lower end of the cylinder is closed by a cap 224. The piston 220 is normally positioned in the cylinder midway between the caps 223 and 224 so that chambers 227 and 229 respectively are formed above and below the piston in the cylinder. A pipe 225 communicates with the upper chamber 227, while a pipe 226 communicates with the lower chamber 229, so that by alternately admitting fluid under pressure through either the pipe 225 or 226, the piston 220 is caused to move up or down, thereby causing the leveling rolls 5 to be tipped laterally of the machine by the above-described mechanism. The pipes 225 and 226 are connected to a valve F (Figs. 17 and 21) having a spool 228 which controls communication between the pipes 225, 226 and the pipe 239 through which fluid under pressure is supplied by the pump P. The spool 228 is automatically moved in a predetermined sequence in the valve F alternately to admit fluid to the upper or lower chamber of the cylinder E, thereby causing the leveling rolls to be tipped in a predetermined manner. For controlling the lateral tipping movements of the leveling rolls as the shoe is being moved forwardly and rearwardly under the rolls, the spool 228 of the valve F has a stem 366 having fixed thereto at its upper end a collar 367. The collar 367 is pivotally connected to one end of a lever 368 which is carried at its opposite end for heightwise swinging movements on a link 370 pivoted at its upper end to a lug 371 fixed to the link 217 of the rack 214. The lever 368 also is pivotally connected by a link 372 to one end of a lever 374 which is mounted for heightwise swinging movements about a pin 375 fixed to a bracket 376 carried on the upper end of the casing of the valve F. Midway of its ends the lever 374 is connected by a link 378 to an arm 380 of a bell crank 381 pivotally mounted on the bracket 376. The other arm of the bell crank 381 is connected by a link 382 to the output end of a differential mechanism 384. The input of the differential is determined by control cams acting through bell cranks 385.

The machine is provided with a plurality of control cams 407 (Figs. 25 and 32) which through associated mechanisms control the automatic operation of the jacks, tipping of the leveling rolls, and control of the leveling pressure. For rotating the cams to control the automatic machine cycle, the machine is provided with a motor 400 (Fig. 25) which acts through a variable speed reduction unit 402 and a roll type clutch 404 to drive a cam shaft 406 journaled in upright portions of the machine frame, the cams being fixed to the cam shaft by a key not shown.

Referring to Figs. 26 through 30, the clutch comprises a driving member 408 and a coaxial driven member 409 which at such times as the clutch is actuated are drivably connected by three rolls 410 interposed between a driving surface 412 of the driving member and flat surfaces 413 of the driven member, see Fig. 27. The driving member is mounted for rotation on a sleeve portion 411 of the driven member 409 and has secured thereto a sprocket 414 (Fig. 25) which is connected by a chain 415 to a sprocket 416 on an output shaft 417 of the variable speed reduction unit. An input shaft 418 of the unit has fixed thereon a pulley 419 which is driven by a belt 420 running between the pulley 419 and a pulley 421 on the motor 400. The driven member 409 is mounted on and fixed to the shaft 406 by a key 422, the members 408 and 409 being located axially of the shaft by a collar 423 secured to the shaft. For moving the rolls 410 into and out of driving position, the clutch is provided with a member 424 mounted for rotation on the shaft adjacent the members 408 and 409 and having projecting therefrom three pins 425 (see Figs. 27 and 28), each of which is arranged to engage a roll 410. The rolls and the pins are received between the surface 412 of the driving member 408 and the surfaces 413 of the driven member 409. The surfaces 413 are inclined radially toward the surface 412 so that when the rolls 410 are moved counterclockwise relatively to the member 409, the rolls become wedged between the surface 412 and the surfaces 413, thus effecting a driving connection between the members 409 and 408. Associated with each roll is a spring 426 carried by the member 409 and adapted to move the roll counterclockwise into driving position when allowed to do so by the associated pin 425. For maintaining the rolls 410 out of driving positions against the action of the springs 426, the pins 425 of the member 424 engage the rolls in advance of their driving positions. For controlling the movements of the pins 425, the member 424 is provided with a flange 428 having a notch 429 (Figs. 29 and 30) adapted to receive one end of a detent 430. When the detent is engaged with the notch 429, the member 424 and hence also the pins 425 are restrained against movement, thereby causing the rolls 410 to be moved out of driving positions against the action of the springs 426 as seen in Fig. 27. When the detent 430 is moved out of engagement with the notch, the member 424 is free to move relatively to the member 409, thus allowing the springs 426 to move the rolls 410 into driving positions and cause the cam shaft 406 to be driven.

To prevent counterclockwise movement of the member 409 relative to the member 408 and thus prevent a free wheeling motion of the member 409 ahead of the member 408, another set of rolls 432 is received between the surface 412 and surfaces 433 on the member 409. The surfaces 433 are radially inclined toward the surface 412 in such manner that any tendency of the member 409 to race ahead of the member 408 causes the rolls 432 to become wedged between the surfaces and thus prevent such undesired movement between the two elements of the clutch. The rolls 432, however, are ineffective to prevent relative clockwise movement of the member 409 such as when the clutch is deactivated. For maintaining the rolls 432 in engagement with the surfaces 412 and 433, the member 409 is provided with springs 434 which urge the rolls into such engagement.

Figure 29:
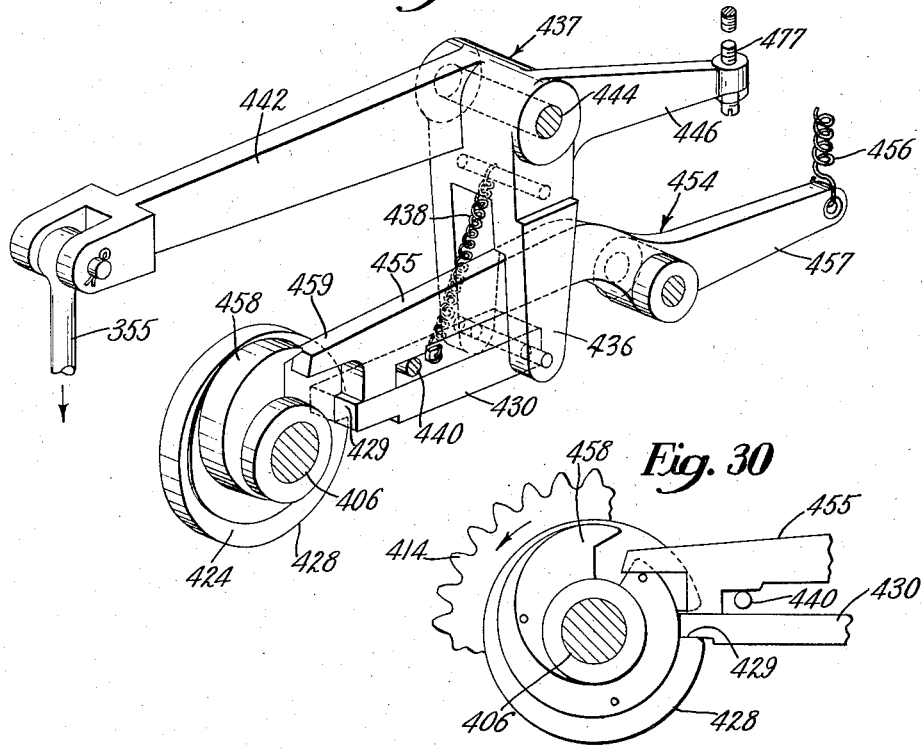
Fig. 29 is a perspective view of a portion of the clutch operating mechanism.
Figure 30:
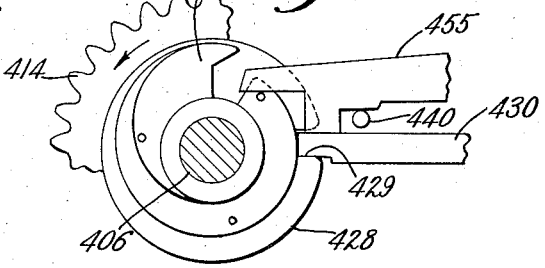
Fig. 30 is a section substantially on line XXX—XXX of Fig. 28.

For controlling the motion of the detent 430 to stop and start the cam shaft, the detent is pivotally secured at its rearward end to a bifurcated arm 436 (Figs. 26 and 29) of a multi-arm lever 437. A spring 438 extending between the arm 436 and the detent 430 urges the detent in a clockwise direction as seen in Fig. 29 to a position normally determined by a pin 440 projecting from an upper portion of the machine frame. Another arm 442 of the lever 437 is connected at its forward end to the rod 355 which as previously described is actuated near the end of the initial rearward movement of the jacks. Thus, as the rod 355 is moved downwardly after the jack has moved into its initial leveling position, the lever 437 is caused to swing about a fulcrum screw 444 moving the detent 430 out of the notch 429 nad allowing counterclockwise movement of the member 424 relative to the member 409. The movement of the member 424 and hence also of the pins 425 allows the springs 426 to move the rolls 410 into driving engagement with the surfaces 412 and 413, causing the cam shaft to be rotated. Another arm 446 of the lever 437 carries at its rearward end an adjustable screw 447 which is adapted to engage the push button of a normally open microswitch 448 which controls energization of the solenoid operated valve J, thereby controlling application of pressure to the leveling rolls. Thus, as the rod 355 is actuated to engage the clutch, causing rotation of the control cams, such actuation also causes the switch 448 to be closed, causing pressure to be applied to the leveling rolls. After the detent 430 has been released from the notch 429, the forward end of the detent rides along the peripheral surface of the flange 428. Immediately after releasing the detent, the rod 355 is automatically released as previously described, and a spring 450 (Fig. 26) on the rod 355 and extending between a collar 451 fixed to the rod and a portion of the machine frame urges the rod upwardly and hence also urges the detent 430 against the periphery of the flange 428. After the cam shaft has completed one revolution, the notch 429 is once again alined with the detent 430, and the detent is moved into the notch by the action of the spring 450. In this manner rotation of the member 424 is stopped, also stopping the movement of the pins 425 and moving the rolls 410, against the action of the springs 426, out of driving positions between the surfaces 412 and 413. Since the rolls 410 at times become tightly wedged in driving positions, a great deal of slow moving force is needed to disengage the rolls. To lessen the force required to unlock the rolls, the clutch mechanism is provided with a lever 454 having a forwardly extending arm 455, a depending portion of which is adapted to engage the detent 430 adjacent the member 424. A spring 456 extending between a pin in the frame and the rearward end of an arm 457 of the lever 454 normally urges the lever 454 in a counterclockwise direction as seen in Fig. 29 into engagement with the detent or the pin 440. However, as the cam shaft is rotated, a cam surface 458 on the member 424 engages a lug 459 on the forward end of the arm 455 to raise the arm against the resistance of the spring 456 and out of engagement with the detent 430. When the clutch parts have made a complete revolution so that the detent 430 is allowed to drop into the notch 429, the lug 459 also loses contact with the cam surface 458 and is moved down by the spring 456 to strike the detent 430 a sharp blow, thus providing sufficient dynamic inertia to unlock the rolls 410 from their driving positions.

Figure 25:
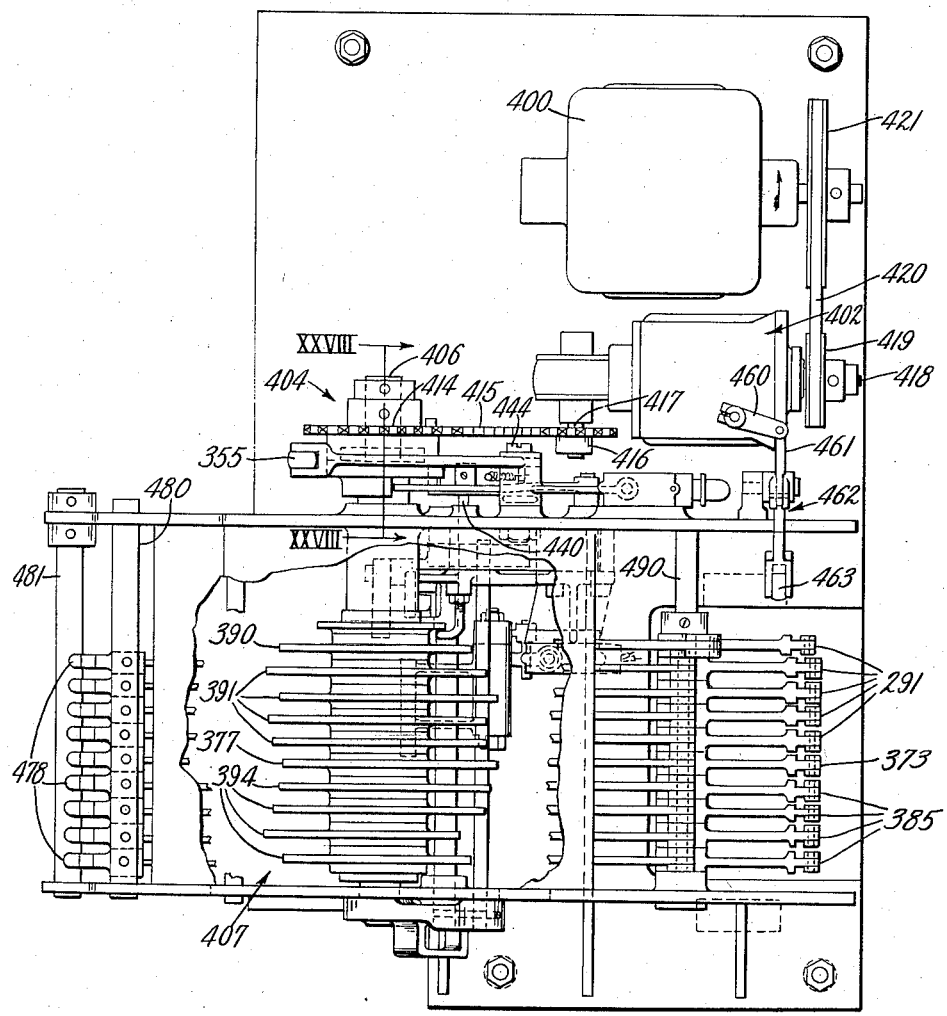
Fig. 25 is a plan view of the upper portion of the machine.

In leveling shoes of varying sizes the linear distance that the jack travels in its rearward and forward movements automatically varies between large and small sizes of shoes being operated upon. Accordingly, if the total elapsed time required for the jack to travel this distance remained constant, the pressure applied by the leveling rolls to a small size shoe would be applied at a much slower linear rate than that for a large size shoe where the jack would travel a much greater linear distance in the same time, which would needlessly decrease the output of the machine. In order to apply leveling pressure at a constant rate regardless of the size of shoe being operated upon, the speed of the cam shaft is arranged to be varied according to the size of shoe to be operated upon. To this end the speed of the output shaft of the varaible speed reduction unit 402 is varied according to the position of a control arm 460 (Fig. 25). The control arm is pivotally connected by a link 461 to one arm of a bell crank 462, the other arm of which is connected by a depending rod 463 to an arm 464 (Figs. 19 and 20) fixed on the shaft 278 so as to swing with the bell crank 277. As previously described, the position of the bell crank 277 is determined by the position of the pin 310 in the jack bracket 30, the initial position of which is varied according to the shoe size. Thus, as the jack is initially adjusted according to the size of shoe to be operated upon, not only is the bell crank 277 adjusted to vary the automatic jack motions, but so also is the position of the control arm 460 varied to control the speed of the cam shaft.

For controlling the motions of the jack, roll tipping, or roll pressure during rotation of the cam shaft each control cam except one which is a master jack cam has associated therewith an arm 470 (Fig. 26) carrying a cam roll 471 and having fixed thereto a depending arcuate arm 472, the arms 470, 472 forming a bell crank. The arm 470 is pivotally mounted for swinging movements about a shaft 473, the arm being urged to swing in a counterclockwise direction to maintain the roll 471 against its associated cam by a spring 469 attached to the arm 472. The arm 472 has slidably mounted thereon for heightwise adjustment toward or away from the shaft 473 a slide 474. For adjusting the position of the slide along the arm 472, a pin 475 in the slide is arranged to ride in a slot 476 in an extension 477 of an adjustable carrier 478. The carrier is mounted for heightwise sliding movements on a bar 479 carried at its ends by two rods 480 and 481, respectively. For maintaining the carrier in adjusted position along the bar 479, the carrier has pivotally mounted thereon a pawl 482 which is arranged to be normally held in frictional engagement with the bar by a spring 483 in the carrier and which may be released by the operator against the action of the spring from engagement with the bar to change the adjustment of the carrier. The slide 474 has pivotally mounted thereon a link 486 which, at its rearward end, is pivotally connected to one of the associated bell cranks 291, 385, or 373. By adjusting the position of the carrier 478 along its associated bar 479, the operator can vary the effective length of the arm 472 and thus vary the amount of motion imparted to the link 486 by its associated control cam through the arm 470. Each of the bell cranks 291, 385, or 373 is journaled on a shaft 490 and is arranged to act through the differential mechanisms 295, 384 or rod 369 effectively to control the motion of the jack, roll tipping, or roll pressure, respectively, depending upon the mechanism with which it is associated.

For controlling the motions of the jack, five of the control cams 407, namely, a master jack control cam 390 (Figs. 25 and 32) and four modifying cams 391, are adapted through the bell cranks 291 to impart motion through the differential mechanism 295 and associated mechanism to the valve spool of the valve G. The master cam 390 acts through an arm 392 (Fig. 20) and a link 393 and is designed to cause a basic motion to be imparted to the jack while each of the modifying cams 391, acting through the arms 472 and links 486, is designed to modify the action of only specific portions of the master cam. Thus, each modifying cam is effective only during a specific part of the jack motion. As previously described, the output of each modifying cam can be independently varied by adjusting the position of its associated carrier slide 478 along its bar 479. The output of the master jack cam is not adjustable since there is no necessity for varying the basic motions of the jack outside of the automatic variance of the jack motion according to the size of shoe to be operated upon. Thus, by adjusting a specific carrier 478, a specific portion of the jack motion may be varied without affecting the remainder of the jack motions.

Figure 32:
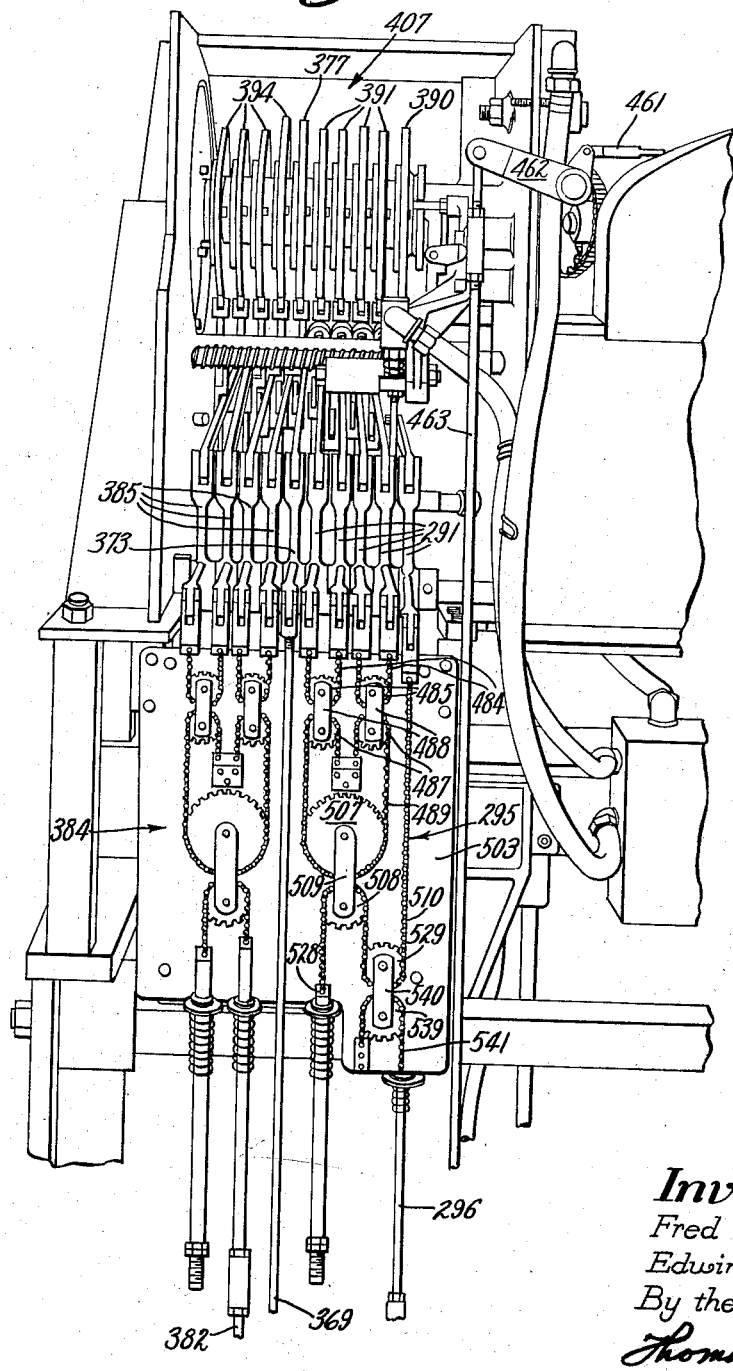
Fig. 32 is a perspective view of the automatic control system of the machine as seen from the rear.

As seen in Fig. 32, the differential mechanism 295 is interposed between the bell cranks 291 and the rod 296 associated with the mechanism for operating the valve G. The bell cranks 291 associated with the modifying cams 391 are connected to the ends of a pair of chains 484 which support a pair of pulleys 485. The motion of each bell crank 291 imparted thereto by its associated cam 391 is transmitted by means of the chains 484 and the pulleys 485 to another pair of pulleys 487, the pivots of which are connected to the pivots of the pulleys 485 by means of links 488. A chain 489 having its ends fixed to a plate 503 secured to the machine frame passes over the pulleys 487, and at an intermediate portion thereof the chain supports a pulley 507 in such manner that any heightwise motion of either or both of the pulleys 487 causes heightwise movement of the pulley 507. The pivot of the pulley 507 is connected to the pivot of a pulley 508 by a link 509 so that the pulley 508 is moved in heightwise directions according to the sum of the motions imparted to the chains 484 by the bell cranks 291 associated with the cams 391. A chain 510, which at its lower end is secured to a relatively fixed but yieldable member 528, passes over the pulley 508, under a pulley 529 and thereafter is secured at its upper end to the bell crank 291 associated with the master jack cam 390. The pulley 529 is connected to another pulley 539 by a link 540 so that heightwise motion, imparted to the chain 510 by movement of the pulley 508 or the bell crank 291 associated with the cam 390, acts through the pulley 529 and link 540 to raise or to lower the pulley 539. A chain 541, fixed at one end to the plate 503, passes over the pulley 539 and is connected at its opposite end to the upper end of the rod 296. It should be apparent from the foregoing that the motion of each bell crank 291 effected by its associated cam 390 or 391 is imparted independently and collectively to the rod 296 through the differential mechanism 295.

For controlling the roll tipping motions, four of the control cams 407, namely, the cams 394 acting through arms 472, links 486, and the bell cranks 385, are adapted to impart motion through the differential mechanism 384 and associated mechanism to the valve spool of the valve F. As may be seen in Fig. 32, the differential mechanism 384 is quite similar to the differential mechanism 295 described above, and its operation should be apparent with reference to the above without further description. Each cam 394 is effective to control the roll tipping movement only during a specific portion of the jack motion so that by adjustment of a specific carrier 478 of the group controlling the roll tip the roll tipping movement associated with a selected portion of the jack motion may be varied independently of the remainder of the jack motions.

From the foregoing description of the cam mechanisms for controlling the power operation of the machine so as to cause it to perform an automatic cycle of operations, it will be understood that the control cams may be designed to vary the cycle in any desired manner by varying the configuration of the cams. Thus, the total number of swinging movements imparted to the jack or tipping movements imparted to the leveling roll may be varied, or the jack may receive a plurality of swinging movements in opposite directions while the roll is operating upon a particular portion of a shoe bottom where it is desired to treat that portion specially before or after other portions of the shoe bottom are leveled. Where the total number of swinging movements imparted to the jack or tipping movements imparted to the leveling roll are varied, it will, of course, be necessary to vary the speed of the cam shaft so that the time allotted to each swinging movement of the jack will be sufficient to allow the leveling roll to be effective.

Figure 31:
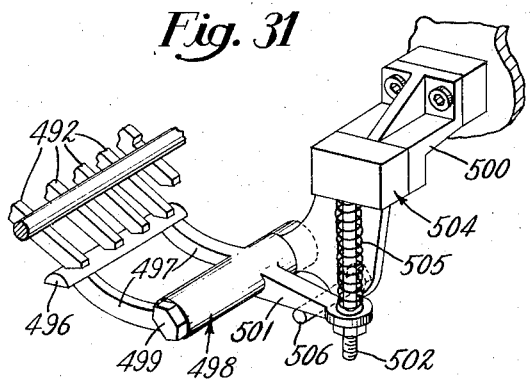
Fig. 31 is a perspective view of a portion of the mechanism illustrated in Fig. 26.

During the automatic operation of the machine the jacks move the shoe back and forth under the leveling rolls in order to subject all portions of the shoe bottom to the pressure applied by the rolls. During such times as the jack motion is reversing in its back and forth movements there is a momentary pause when the jack is stationary. During such pauses it has been found that the static application of pressure to the shoe bottom sometimes causes the formation of a visible indentation in the shoe bottom. Accordingly, it has been found desirable to relieve the leveling pressure during such momentary pauses of the jacks. To this end each of the cam arms 470 associated with the jack control modifying cams 391 is provided with extensions 492 (Figs. 20 and 26) slidably mounted in the arms so as to be movable to and from operative positions. Each of the extensions is pivotally connected to a forwardly extending bar 493 which at its forward end is provided with two notches 494 for determining the operative and non-operative positions of the extension by engagement with a rod 491 carried by a bracket 495 fixed to the frame. When in operative positions, as illustrated in Figs. 26 and 31, the extensions are adapted to engage a bar 496 carried by arms 497 of a lever 498 fulcrumed at 499 on a bracket 500 fixed to the machine frame. Another arm 501 of the lever carries an adjustable screw 502 arranged to engage the switch button of a normally closed microswitch 504 secured to the bracket 500. A spring 505 mounted between the arm 501 and the casing of the switch urges the arm away from the switch button to a position determined by a stop pin 506 in the bracket 500. The switch 504 is arranged in series with the switch 448 (Fig. 42) so that opening of the switch 504 causes the solenoid operated valve J to be de-energized, allowing the spool 542 to shift, thus exhausting the fluid in the roll cylinders 177 through the valve J and thereby interrupting the application of pressure to the leveling rolls. Each jack control modifying cam has a rise at the appropriate position to control a specific portion of the rearward movement of the jacks, all of the cams 391 being so coordinated that, in addition to the master jack cam 390, only one cam 391 controls the jack motion at any particular time. When the cam roll 471 of a particular arm 470 is riding on the peak of the rise of its associated cam, the arm is in its lowermost position causing its associated extension 492, if in operative position, to depress the bar 496 to cause the normally closed switch 504 to be opened momentarily. Opening the switch causes the valve J to be de-energized, thus relieving the roll pressure at the precise instant that the jack is pausing in its movement before reversing its direction of movement. In this manner an undesirable indentation in the shoe bottom is avoided. As soon as the roll 471 rides off the peak of the cam, the lever 470 rises, releasing the lever 498 and allowing the switch 504 to close, thus causing the valve J to be re-energized and the pressure once again to be applied to the leveling rolls during the return movement of the jacks.

The hydraulic system for operating the jacks and roll tipping movements is diagrammatically illustrated in Fig. 41, the movable elements of the system being shown in their inactive positions. Fluid under pressure is supplied to the system through the pipes 110, 239, and the pipe 517 by a pump P. The pipe 517 supplies fluid through a control valve L, and a pipe 518 to a pressure relief valve 516, the valve 516 being set to produce a relatively low pressure in the pipes 110 and 239 when the machine is at rest or in the initial stages of operation. The pipe 239 supplies fluid to the roll tip control valve F and to the jack control valve G, each valve at this time being in a neutral position whereby neither the jack cylinder nor the roll tip cylinder are active. The pipe 110 supplies fluid to the toe gage operated valve A, the position of the valve at this time closing off the pipe 110.

When the shoes are placed on the jacks and moved rearwardly until the tips of the shoes engage and move the toe gage, the piston 100 of the valve A is moved upward closing off an exhaust port 112 and allowing fluid to pass from the pipe 110 to the pipe 111. The pipe 111 supplies fluid to the jacking cylinders B of both jacks to tilt the last pins, to the cylinder C to lock the position of the adjusting bar 308, to the cylinder D of both jacks to lock the jacks in adjusted position, and to a closed port in a manually operated starting valve M.

To initiate the automatic operation of the machine after the jack has been adjusted and locked in position the operator depresses buttons 515 (see also Fig. 1) to open two starting valves M and M1. The starting valves are arranged in series so that both buttons 515 must be depressed at the same time to initiate the machine cycle. When the valves M and M1 are opened, fluid under pressure is allowed to pass from the pipe 111 through the valves to a pipe 514. The pipe 514 communicates fluid to one end of the control valve L to move a valve element 512 against the action of a spring 511 to an operative position in the valve. Since the operator immediately releases the starting buttons, thereby causing the starting valves to open and exhaust pressure from the pipe 514, the element in the valve L is latched in a manner to be described in operative position for the remainder of the machine cycle. The valve element in operative position causes an exhaust port 513 and the pipe 518 to be closed off and allows communication from the pipe 517 to the pipe 520 which conducts high pressure fluid to a pilot valve N and to a manually operated selector valve T. By closing off the pipe 518 the valve 516 is rendered ineffective to control the fluid pressure in the system and another relief valve 521, which is set to produce a relatively high pressure, then becomes effective to control the operating pressure in the system. The pipe 514 also leads fluid under pressure to one end of the pilot valve N causing a valve spool 519 therein to shift to operative position against the action of a spring 522, closing off an exhaust port 523 and allowing communication between the pipe 520 and a pipe 524. The spool 519 is thereafter latched in a manner to be described in operative position for the remainder of the machine cycle. The pipe 524 supplies fluid under high pressure from the valve N through a regulating check valve 524a to the cone support cylinders 138 of both jacks through the pipe 142 and also supplies fluid to another pilot valve S to shift a valve element therein against the action of a spring 530, closing off an exhaust port 531 and allowing communication from a pipe 532 through a regulating check valve 320a to the cylinder H. The valves 524a and 320a are generally similar to conventional ball check valves except that each valve is provided with an adjusting screw which prevents the check ball from seating completely. Thus because of the adjusting screw, a variable restricted flow of fluid is allowed to pass through the valve in one direction while the fluid may pass unrestricted through the valve in the opposite direction. Fluid under pressure is supplied to the pipe 532 from a secondary system which is supplied by a pump P1 (Fig. 42) under a pressure controlled by the relief valve K. When pressure is supplied to the cylinder H, the rearward end of the lever 260 (Fig. 20) is raised by the piston 264 causing the valve spool 240 of the valve G also to be raised, allowing fluid to pass from the pipe 239 to the pipe 163 and into the cylinder 157, thus raising the rack 154 and causing the jack to be swung rearwardly to its starting position. Near the end of the upward motion of the lever 260 the flange 328 (Fig. 23) of the stem of the piston 264 of the cylinder H acting through the arm 322, the lever 343, the bar 346 (Fig. 19), arms 350, 354, and the rod 355 causes the clutch mechanism to be actuated, thus also causing the cam shaft 406 to be driven. In this manner the control cams 407 are caused to rotate and act through their associated mechanisms causing the valves G and F to be actuated automatically to control the motion of the jack and roll tipping mechanisms respectively. Also, when the clutch is actuated, the normally open switch 448 (Figs. 26 and 42) is closed by the arm 446 and the contact screw 447 to energize the valve J, thereby causing fluid under pressure to be supplied through the pipes 209 to the roll pressure cylinders 177, moving the leveling rolls down against the bottom of the shoes on the jacks.

In addition to supplying fluid from the valve N to the cone support cylinders 138 and the valve S, the pipe 524 also conducts high pressure fluid to the selector valve T. The selector valve is provided with a manually actuated spool 525 which in the position illustrated in Fig. 41 closes off communication from the pipe 520 and allows fluid to pass from the pipe 524 through the valve T and a regulator valve 114a and through the pipe 114 to the chamber 116 of the valve A. Like the valves 524a and 320a, above referred to, the valve 114a is adjustable to regulate the flow in one direction and allow a free flow in the opposite direction. The fluid admitted to the chamber 116 thereupon raises the piston 100, causing the toe gage parts to be retracted to a position below the level of the shoe bottoms, as previously described.

The secondary hydraulic system for supplying pressure to the cylinder H through the pipe 532 and the valve S and for supplying pressure to the roll pressure cylinders 177 is diagrammatically illustrated in Fig. 42. Pressure fluid is supplied to this system from a sump through a pipe 533 by a pump P1. The pipe 533 conducts fluid not only to the pipe 532 to supply the cylinder H, but also communicates with a pipe 536 leading to the solenoid operated valve J. For controlling the fluid pressure delivered to the roll pressure cylinders 177, a pipe 537 leads from the pipe 533 to a chamber 534 in the lower end of the pressure regulating valve K. The pressurized fluid in the chamber 534 exerts a force against the lower end of a piston 535 extending into the chamber. The upper end of the piston engages the lower end of the valve element 358 to exert an upward thrust on the element. As soon as the pressure in the system exceeds a desired value, the upward force exerted by the piston overcomes the downward force exerted by the springs 357 and 363, causing the element 358 to rise and expose the exhaust port 347. Another pipe 538 also leads from the pipes 532, 536 to another chamber 539a of the valve K, which chamber communicates with the exhaust port 347 as controlled by the valve element 358. Thus, when the pressure in the system rises above a selected value, the valve element 358 rises to bleed the excess pressure from the pipe 538 through the exhaust port 347. As previously described, the pressure controlled by the valve K may be either manually set by the adjusting bar 338 acting on the spring 357 and/or by the pressure control cam acting through the rod 369 on the spring 363.

The solenoid operated valve J is provided with a spool 542 having at one end thereof an armature 543 received in a solenoid coil 544. The coil 544 is arranged to be energized from a suitable source of electrical energy through a circuit which is closed upon closure of the normally open switch 448, which is also in series in the circuit with the normally closed switch 504. As previously described, the switch 448 is closed simultaneously with closure of the clutch 404, thereby energizing the coil 544. Energization of the coil acts on the armature 543 to move the valve spool 542 to an operative position, as viewed in Fig. 42, closing off an exhaust port 545 and allowing fluid to flow from the pipe 536 through the valve J to the pipe 209 and thence to the roll pressure cylinders 177. In this manner fluid under a controlled pressure is communicated to the roll pressure cylinders to cause the leveling rolls to be moved down against the bottoms of the shoes previously moved into position under the rolls.

As illustrated in Fig. 35, the control valve L. pilot valve N, and selector valve T are mounted in a valve block 546 secured to the side frame of the machine. The spool 512 of the valve L is mounted for heightwise movements in a sleeve 547 received in a bore in the block 546. The upper end of the spool is received in a bore of a cap 548 secured to the block 546, the bore also receiving a plunger 550 which receives the upper end of the spring 511. The spring 511 urges the spool 512 downwardly to a position determined by engagement with a lower cap 549 secured to the underside of the valve block. The spool 519 of the pilot valve N is mounted for heightwise movement in a sleeve 554 received in another bore in the valve block. The upper end of the spool is received in a bore 553 of a cap 555 secured to the block 546. Also received in the bore 553 is a plunger 556 containing the upper end of the spring 522 which normally urges the spool 519 down to a position determined by engagement with the cap 549. The upper end of the spool 519 is provided with an annular groove 557 which is adapted to receive a latch block 558 carried by a latching arm 559 fulcrumed on a pin 560 mounted in a pair of lugs on the upper end of the cap 555. The arm 559 is provided with a lug 562 having threaded therein an abutment screw 561 which engages the upper end of the plunger 556. The spring 522 in addition to exerting a force on the spool 519 also acts on the plunger 556 to urge the arm 559 to swing in a clockwise direction about the pin 560, as seen in Fig. 35. As previously described, upon depression of the starting valves M and M1, fluid under pressure is introduced through the pipe 514 to raise the valve spools 512 and 519 against the action of their springs 511 and 522, respectively. When the spool 519 is raised to its upper position, the groove 557 of the spool becomes alined with the latch bar 558 allowing the bar to be moved into the groove by the action of the spring 522 on the latching arm, thereby latching the spool in its operating position. The latching arm 559 is also provided with an extension 563 which carries an adjustable abutment 564 arranged to be engaged by a shoulder 567 of a latch 565. The latch is pivotally mounted at its lower end by a pin 566 carried by a block 569 on the end of the clutch operating rod 355, the latch being urged to swing in a counterclockwise direction as seen in Fig. 34 by a spring 568 arranged between the latch and the block. The latching arm 559 is also provided with an abutment screw 570 which in the position illustrated in Fig. 35 holds the latch 565 out of engagement with the abutment 564 against the action of the spring 568. However, when the latching bar 558 moves into the groove 557, the abutment screw moves away from the latch allowing the latch to engage the abutment 564. The valve L is provided with a latching bar 576 (Figs. 33 and 38) carried by a latching arm 577 which operates in a manner identical with the operation of the latching bar 558 to maintain the valve spool 512 up in its operating position. In this manner when the fluid pressure is exhausted from the pipe 514 upon release of the starting valves by the operator, the latches 576 and 558 maintain the valve spools 512 and 519 respectively in their operating positions for the remainder of the machine cycle while the machine is operating under the control of the control cams. Also associated with the latching arm 577 is an extension arm 578 fixed thereto and carrying at its forward end an adjustable screw 575 adapted to engage the switch button of a normally closed switch 574. The switch 574 is arranged in series with the switches 448 and 504 in the electrical circuit which controls energization of the roll pressure control valve J. Thus, when the latching bar 576 engages the latching groove in the valve spool 512, the latching arm 577 is swung counterclockwise as viewed in Fig. 37 causing the screw 575 to move downwardly away from the switch 574 allowing the switch to close and hence also allowing the valve J to be energized simultaneously with closure of the clutch. During the following portion of the machine cycle, the jacks are automatically moved forwardly and rearwardly by the admission of pressure fluid into the cylinders 157 and 158; the leveling rolls are held down against the shoe bottoms by the pistons 200 in the cylinders 177 under pressures controlled by the valve K; and the leveling rolls are tipped at predetermined times according to the portion of the shoes then under the rolls by operation of the piston 220 in the cylinder E.

At the end of the leveling operation of the machine, at which time the cam shaft has completed one revolution, the clutch is opened and the clutch rod 355 is thereupon moved up by the spring 450 (Fig. 26).

Upward movement of the rod 355 causes the latching arm 559 to be moved counterclockwise, as seen in Figs. 35 and 38, by the latch 565 against the action of the spring 522. In this manner the latching bar 558 is moved out of the groove 557 allowing the spool 519 of the valve N to be moved down to its closed position by the spring 522. Near the end of the upward movement of the rod 355, the abutment screw 570 of the latching arm swings the latch 565 against the action of the spring 568 to disengage the latch from the abutment 564. In its closed position the spool 519 closes off the pipe 520 (Fig. 41) and allows the fluid pressure to flow from the pipe 524 through the valve to the exhaust port 523. By exhausting the pressure from the pipe 524 the pressure fluid is exhausted from the cone support cylinders 138, the pilot valve S and from the chamber 116 of the valve A. When the fluid is exhausted from the chamber 116 the piston 100 of the valve A returns to its closed position as seen in Fig. 41 causing the fluid pressure in the pipe 111 to exhaust from the exhaust port 112 through the valve A, thereby causing the pistons 61 of the cylinders B to relieve the pressure on the last spindles, causing the piston 316 of the cylinder C to return to its initial position thereby unlocking the bar 308 and causing the piston 128 of the cylinder D to return to its initial position thereby unlocking the component parts of the jack mechanism. Also, upon exhausting pressure fluid from the pipe 524 the cone supports are returned to their initial positions and the valve element in the pilot valve S is returned to its closed position closing off communication from the pipe 532 and allowing the fluid pressure in the cylinder H to flow through the valve and from the exhaust port 531. As the fluid is exhausted from the cylinder H the valve spool 241 of the valve G (Fig. 20) is moved downwardly causing the jack to be moved forwardly to its initial inoperative position clear of the leveling roll.

For unlatching the spool 512 of the valve L to allow the spool to return to closed position, an arm 580 (Figs. 33 and 38) fixed to one end of a horizontal shaft 581 carried in the portion 582 of the cap 555 is arranged to be moved by a pin 593 (see also Fig. 6) in the jack segment 39. Fixed to the other end of the shaft 581 is an arm 583 which carries, by means of a pin 584, a latch 585. A shoulder 594 of the latch is adapted to engage an abutment 591 on the latching arm 577. A spring 590 extending between the latch and the latching arm 577 urges the latch to swing about the pin 584 and into engagement with the abutment 591. The latch 585 also has a forwardly extending arm 586 carrying an adjustable screw 587, the upper end of which is adapted to engage a horizontal pin 588 carried in a lug 589 of the valve block 546. As the jack is swung rearwardly to its starting position the pin 593 carried on the gear segment 39 moves downwardly out of engagement with the arm 580. The arm 580 and hence also the arm 583 swing downwardly under the action of a spring 579 (Fig. 40) which extends from the valve block to the arm 583 until a stop screw 597 carried by the arm engages the pin 588. In this manner the latch 585 is moved downwardly until the shoulder 594 is allowed to move in under the abutment 591 on the latching arm 577. At the end of the automatic cycle of the machine at which time the fluid pressure is exhausted from the cylinder H, the jack is moved forwardly to its initial inoperative position causing the pin 593 of the jack segment to raise the arms 580 and 583 thereby causing the latch 585 to swing the latching arm 577 in a clockwise direction, as viewed in Fig. 38. Clockwise movement of the latching arm moves the latching bar 576 out of engagement with the valve spool 512 allowing the spool to be returned to its closed position by the spring 511. Near the end of the upward movement of the latch 585 the screw 587 in the arm 586 of the latch engages the underside of the pin 588 causing the latch to swing forward about its fulcrum pin thereby disengaging the shoulder 594 from the abutment 591. In closed position the spool 512 of the valve L allows communication between the pipe 517 and the low pressure relief valve 516 thereby reducing the fluid pressure in the hydraulic system. The position of the spool 512 also allows fluid pressure to flow from the pipe 520 through the valve L to an exhaust port 513. In this manner the various control elements of the hydraulic system are returned to their initial at rest positions whereby the leveling operation is completed and the shoes may be removed from the jack by the operator.

For stopping the operation of the machine at any time during the automatic leveling cycle thereof the machine is provided with a treadle 600 (Fig. 1) which is normally held in raised position by a spring 601. The treadle is pivotally connected by means of a rod 602 to a lever 605 (Figs. 38 and 39) which is mounted for heightwise swinging movements on a pin 606 carried by lugs on the valve block 546. An upwardly extending arm 607 (Fig. 39) of the lever 605 is provided with a flat 608 adapted to engage a pin 609 carried by the latching arm 577 adjacent the latching bar 576. Thus, upon depression of the treadle, the lever 605 is swung down about the pin 606 causing the flat 608 to engage the pin 609 and move the latching bar 576 out of engagement with the valve spool 512 thereby allowing the valve L to be closed. As previously described, closure of the valve L causes the fluid pressure to be exhausted from the pipe 520 and, through the valve N, which remains latched in open position, permits exhaust of the fluid from the cylinder 138, causing the cone supports to return to their initial position. The fluid also exhausts from the pilot valve S, whereupon the spool of the valve moves to the left (Fig. 41), thereby exhausting the cylinder H and exhausting the fluid from below the toe gage piston 100 which returns to its initial position, thereby permitting exhaust of fluid from the jack lock cylinder D unlocking the jacks.

As an added safety feature, the motor driving the hydraulic pumps P and P1 is caused, by depression of the treadle, to be shut down in the following manner. The arm 607 of the treadle lever 605 has pivotally connected thereto, by means of a pin 611 (Fig. 39), one link 610 of a toggle 613. The other link 612 of the toggle is pivotally connected to the lever 583 by means of the pin 584. As previously described, the lever 583 is in its downward position during the automatic operation of the machine, thereby also carrying the pin 584 to a lowered position causing the toggle 613 to assume the position illustrated in Fig. 39. At the point where the links 610 and 612 of the toggle are joined the toggle 613 is adapted to engage a surface 615 of a lever 616 mounted for swinging movements on the pin 588. A forwardly extending arm 618 of the lever 616 carries an adjustable screw 619 adapted to engage the switch button of a normally closed switch 620 which is included in the electric circuit for driving the pump motor. Thus, when the treadle is depressed the joint of the toggle is moved downwardly causing the lever 616 to swing clockwise, as seen in Figs. 38 and 39, thereby causing the screw 619 to open the switch 620, hence also causing the pump motor to be shut down. It should be apparent from Fig. 39 that the toggle is effective to operate the switch 620 only during the automatic cycle of the machine when the arm 583 is in its lowest position. When the jack is in its initial forward position the arms 580, 583 are in their highest positions causing the toggle 613, through the pin 584, to be swung heightwise away from the lever 616. Thus, when the jack is in its forward initial position, the position of the toggle is such that depression of the treadle cannot cause the pump motor to be shut down.

As previously described, it is sometimes desirable manually to pound the forepart of the shoe after the automatic leveling operation, and at such times it is necessary that the shoe be maintained firmly on the jack when in its most forward position. To this end, the spool 525 (Fig. 35) of the selector valve T is arranged to be shifted to an upper position by movement of a knob 628 (Fig. 38). The knob is pivotally connected by a rod 629 to an arm 630 which is fixed to one end of a shaft 631 carried in a bearing 632 on the cap 548. The other end of the shaft has fixed thereto an arm 633 which is pivotally connected at its rearward end to the upper end of the valve spool 525 by a link 526. Thus, by moving the knob 628 forward the valve spool 525 of the selector valve is caused to be moved to its upward position closing off the pipe 524 and allowing communication between the pipes 520 and 114 (see Fig. 41). For maintaining the spool 525 in either of its two positions, a spring pressed detent 527 (Figs. 35 and 36) is arranged to engage either of two grooves 528a in the spool 525. Also carried on the arm 630 (Figs. 33 and 38) by means of a fulcrum pin 635 is an abutment arm 636 the forward end of which rests on the upper end of the latch 585, the arm being held down on the latch by a spring 637. When the arm 630 is swung forwardly by the knob 628 a shoulder 638 on the arm 636 engages and swings the latch 585 forwardly about its fulcrum pin 584 and against the action of the spring 590 to a position where the latch is out of engagement with the abutment 591 of the latching arm 577. Thus, when the jack returns to its initial forward position due to exhaustion of the cylinder H, the pin 593 raises the arms 580 and 583, but the latch 585 is moved upwardly without causing the valve spool 512 of the valve L to be unlatched. Referring to Fig. 41, in this position of the selector valve when the valve L is opened at the start of the machine cycle, fluid under pressure is introduced to the chamber 116 of the valve A through the valve T from the pipe 520, the pipe 524 being closed off by the spool 525. Thus, at the end of the machine cycle when the valve spool 519 of the valve N is unlatched and returned to closed position the pressure is exhausted from the pipe 524 resulting in return of the jack to its most forward position. However, since the valve spool 512 of the valve L remains in its open position, due to the ineffectiveness of the latch 585, the pipe 520 remains pressurized causing the piston 100 of the valve A to be held in its upward position to maintain the jack parts in their locked position. In this manner, the shoe is firmly held by the jack in a position clear of the leveling rolls, allowing the operator to pound the forepart manually without interference from the machine. Upon completion of the manual toe pounding operation the operator depresses the treadle 600 to unlatch the spool 512 of the valve L thereby causing the pressure fluid to be exhausted from the valve A, to cause the jack to release the shoes for removal.

In the operation of the machine, when a different style or type of shoes are to be operated upon, the operator selectively adjusts the automatic controls according to the style and type of such shoes. By adjusting the appropriate adjusting carriers 478 (Fig. 1), the operator selects the amount of jack motion and roll tip to be allotted to each portion of the shoe bottom according to the style thereof. By such setting the operator varies the output of any of the jack modifying cams 391 (Fig. 25), the roll tip control cams 394 or the pressure control cam 377. If it is desired to relieve the roll pressure at any portion of the shoe bottom, the operator moves the selected adjusting bar or bars 493 (Fig. 1) to operative position thereby making the motion of selected cam levers 470 (Fig. 26) effective to cause opening of the switch 504 through the lever 497. Opening of the switch 504 (Fig. 42) at the appropriate time selected by adjustment of the bar or bars 493 deenergizes the solenoid operated valve J momentarily to relieve the fluid pressure in the roll pressure cylinders 177. Depending on the inclination of the bottom of the shoes to be operated upon, the position of the adjusting bar 338 (Fig. 17) is varied by engagement of the appropriate notch 339 in the bar with the pin 340. Such adjustment of the bar 338 varies the position of the cam 330 (Fig. 19) to predetermine the motion of the piston 264 in the cylinder H and thereby also to predetermine the initial motion of the jack prior to the application of roll pressure and subsequent automatic rearward and forward motion of the jacks. Adjustment of the bar 338 also varies the position of the cam 360 (Figs. 17 and 22) to adjust the compression of the spring 357 (Fig. 22) of the relief valve K thereby determining the roll pressure to be applied to the shoe bottom according to its inclination. If the operator desires to have the shoes remain locked on the jacks after the automatic leveling operation of the machine, the operator sets the selector valve T by moving the knob 628 (Fig. 38) to its forward position thereby closing off the pipe 524 (Fig. 41) and allowing communication between the pipes 114 and 520 through the valve. If it is desired to have the shoe automatically released at the end of the leveling operation, the knob 628 is placed in its rearward position thereby closing off the pipe 520 and allowing communication between the pipes 114 and 524 through the valve. It should be noted that the operator has no necessity for adjusting the machine according to the size of shoe to be operated upon, the size adjustment being automatically made by the machine.

Having manually adjusted the machine according to the style of shoes to be operated upon, the operator places the shoes on the jacks with the thimble of the last on the last pins 10 (Figs. 1 and 3) and moves the shoes rearwardly until the toe ends of the shoes engage and actuate the toe gages 8. Actuation of the toe gages causes the spool 115 (Fig. 41) of the valve A to be raised until the exhaust port 112 is closed and fluid pressure is allowed to flow from the pipe 110 to the pipe 111 through the valve. The pipe 111 conducts fluid under pressure to the cylinders B to cause the last pins to be tilted, forcing the toe end of the shoe firmly against the toe support 4; to the cylinder C to lock the size adjustment of the jack by locking the slide 308; to the cylinder D to fix the position of the heel supports relative to the toe gage post and to a closed port in the starting valve M. In this manner the relative positions of the heel, cone and toe supports are automatically adjusted by manual movement of the shoes on the heel supports and the supports are automatically fixed in adjusted positions upon actuation of the toe gages. Movement of the heel supports prior to engagement of the toe end of the shoe with the toe gage also automatically sets the jack control mechanism according to the size of shoes on the jack by adjusting the position of the bar 308 which follows the movement of the pin 310 (Fig. 6) in the jack bracket 30. Adjustment of the bar 308 varies the position of the bell crank 277 (Fig. 20) thereby varying the distance between the pin 272 and the fulcrum 284 of the rocking lever 282 according to the size of shoe to be operated upon as measured by the movement of the heel support prior to the locking thereof. As soon as the toe gage is actuated, the position of the bar 308 becomes fixed thereby adjusting the output of the jack control mechanism to vary the extent of jack motion according to the size of shoe to be operated upon.

Figure 17:
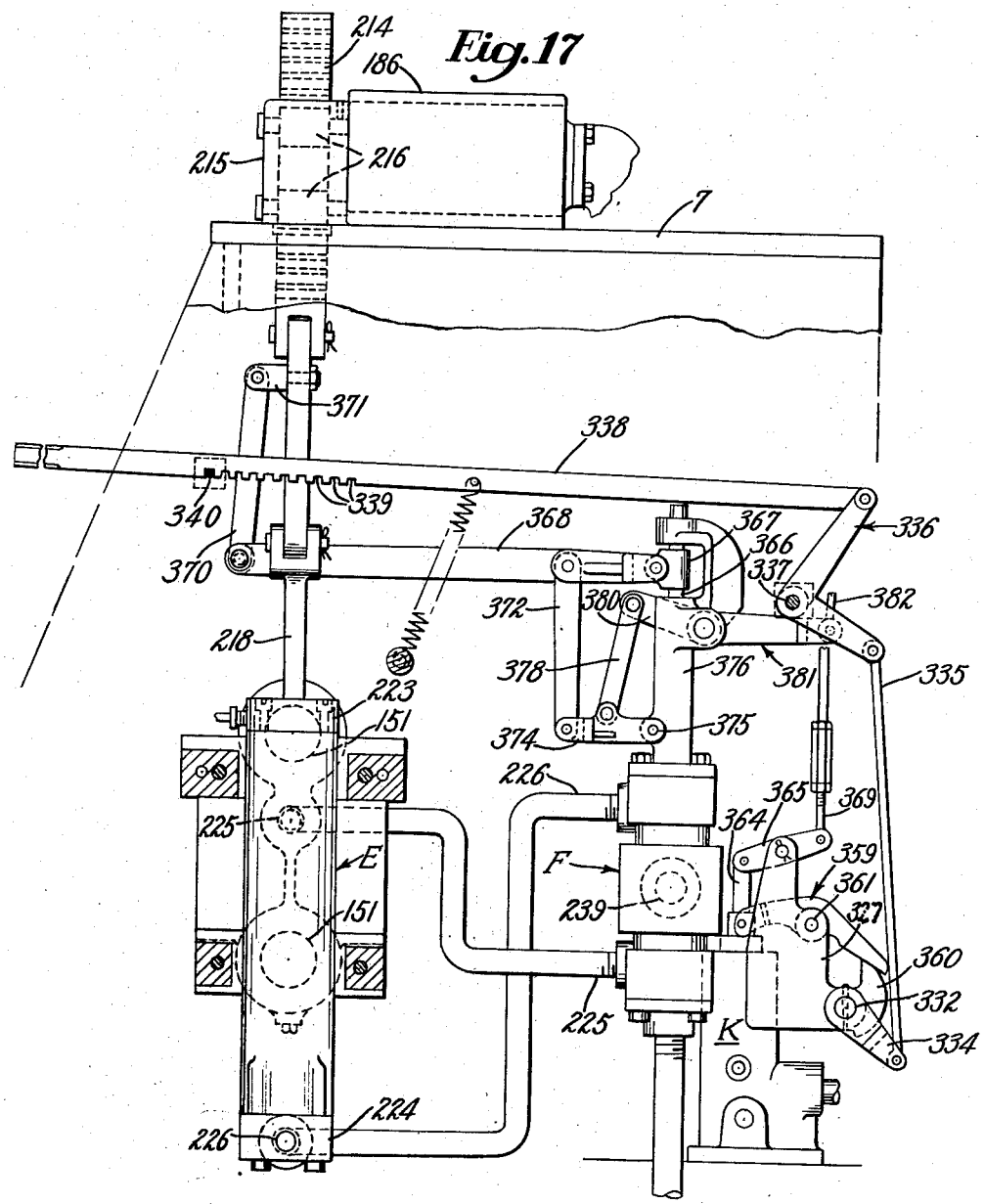
Fig. 17 is a side elevation of the machine with parts broken away to illustrate the roll tip control mechanism.
Figure 18:
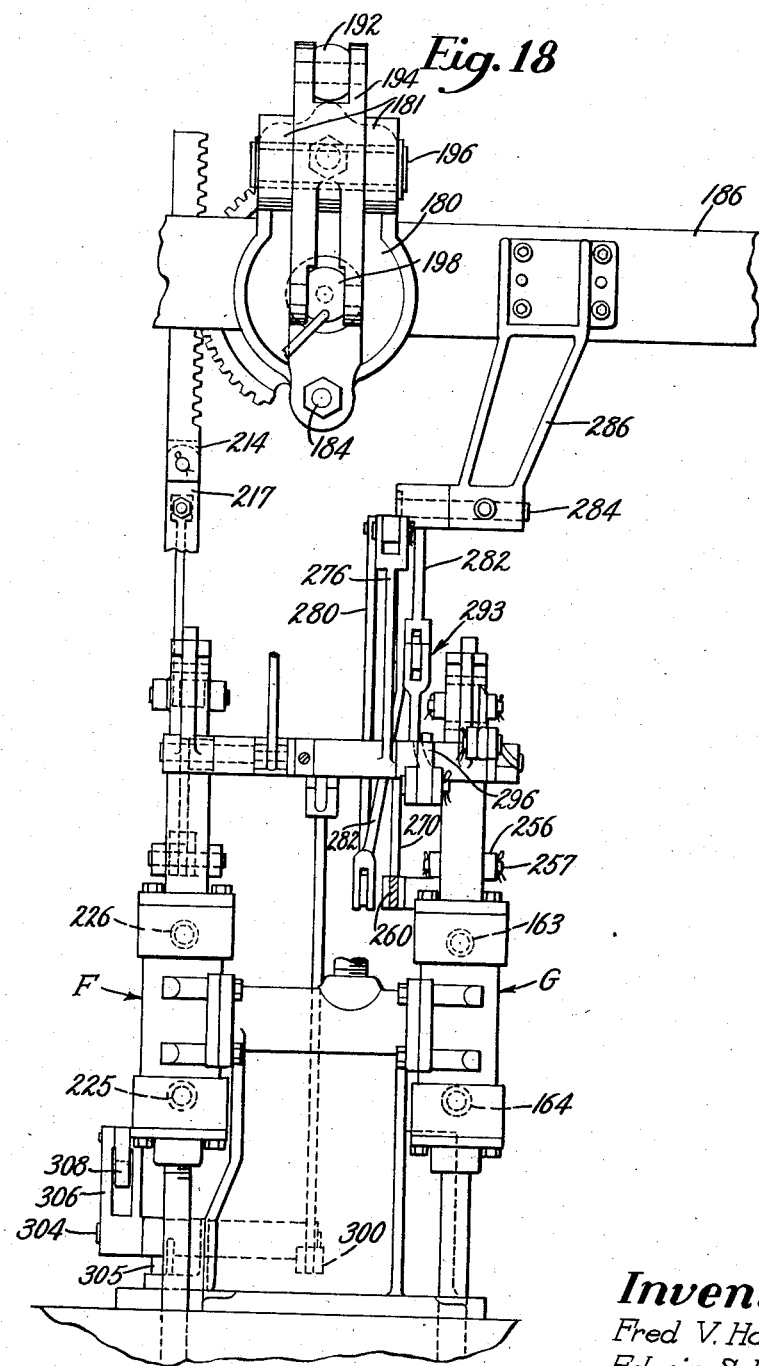
Fig. 18 is a rear elevation of the mechanism illustrated in Fig. 17 with parts added.

To commence the automatic operation of the machine, the operator must depress the two widely separated starting buttons 515 (Fig. 1) simultaneously, thereby insuring that the operator's hands are away from dangerous areas of the machine. Depression of the starting buttons allows fluid under pressure to flow from the pipe 111 (Fig. 41) through the starting valves M and M1 to the pipe 514 which communicates pressurized fluid to the control valve L and to the pilot valve N. Introduction of fluid to the valve L causes the valve element 512 to shift therein closing off communication to the low pressure relief valve 516 from the pipe 517 thereby making the high pressure relief valve 521 effective to control the pressure of the fluid supplied to the hydraulic system by the pump P. The position of the spool 512 also closes off the exhaust port 513 and allows communication between the pipe 517 and the pipe 520 which leads to the pilot valve N and the selector valve T. If the operator has moved the knob 628 to its rearward position to effect automatic release of the jack at the end of a machine cycle, then the position of the spool 525 in the selector valve T closes off the pipe 520 at the valve. Introduction of pressurized fluid from the pipe 514 to the pilot valve N causes the spool 519 therein to be shifted, thereby closing off an exhaust port 523 and allowing communication between the pipe 520 through the valve to the pipe 524. Fluid under pressure is led through the pipe 524 to the pilot valve S, to the selector valve T and to the cone support cylinders 138. Introduction of fluid to the pilot valve S causes the valve element therein to shift, closing off the exhaust port 531 and allowing pressurized fluid from the secondary system to flow from the pipe 532 through the valve to the cylinder H through the pipe 320. Introduction of pressurized fluid to the selector valve T allows fluid to be conducted through the pipe 114 to the chamber 116 of the toe gage valve A, thereby raising the spool 115 therein to retract the toe gages below the level of the shoe bottoms. As pressurized fluid passes into the cylinder H from the pilot valve S the piston 264 rises to a position limited by engagement of the flange 328 (Fig. 19) with the lever 322. The motion of the piston swings the lever 260 upwardly and through the lever 256, the link 254 and the lever 246 causes the valve spool 240 in the valve G to be raised thereby allowing fluid to flow from the pipe 239 through the valve G and the pipe 163 to the cylinder 157 causing the rack 154 to be raised. Upward movement of the rack acting through the gear 40 and the segment 39 causes the jack to be moved rearwardly until movement of the rack 250 acting on the lever 246 causes the valve spool 240 to be returned to a neutral position closing off the pipe 163 and stopping further movement of the jack. The initial movement of the jack caused by operation of the cylinder H positions the toe end of the shoe under the leveling roll in a predetermined position as determined by the setting of the bar 338 (Fig. 17). Near the end of the upward movement of the piston 264 of the cylinder H the pin 324 (Fig. 19) carried by the lever 322 engages the lever 342 and causes the lever 343 to be swung rearwardly causing actuation of the clutch through the bar 346, levers 350 and 354 and the rod 355. Movement of the rod 355 causes the detent 430 (Fig. 29) to be moved out of the notch 429 of the member 428 of the clutch allowing the clutch members to engage and drive the cam shaft 406. As the cam shaft rotates the jack control cams 390 and 391 (Fig. 20), acting through the bell cranks 291 and the differential 295, impart a rocking motion to the bell crank 293 to cause automatic actuation of the valve G according to a schedule determined by the cams. Automatic actuation of the valve G causes pressurized fluid to be admitted alternately to the cylinders 157 and 158 (Fig. 19) to move the jack rearwardly and forwardly according to a predetermined schedule. As the cam shaft rotates, the roll tip control cams 394 (Fig. 21) acting through the bell cranks 385 and the differential 384 impart a rocking motion to the bell crank 381 to cause a predetermined schedule of motions to be imparted to the spool 228 of the valve F. As the valve F is operated according to a predetermined schedule, fluid is admitted alternately to each end of the cylinder E to cause the rolls to be tipped continuously in appropriate directions and extents for the particular portions of the shoes then under the rolls. As the cam shaft rotates, the roll pressure cam 377 (Fig. 32), acting through the bell crank 373, the rod 369, and the lever 365 (Fig. 22), varies the compression of the spring 363 of the valve K to vary the roll pressure according to the portions of the shoe bottoms under the rolls.

Upon completion of one revolution of the cam shaft the detent 430 (Fig. 29) once again engages the notch 429 thereby opening the clutch and stopping rotation of the cam shaft. When the clutch is opened the rod 355 is moved upwardly causing the latch bar 558 (Fig. 35) to release the spool 519 of the pilot valve N, thereby allowing the spool to be returned to its initial position by the spring 522. In its initial position the spool 519 closes off the pipe 520 and allows the pressurized fluid in the pipe 524 to flow through the valve to an exhaust port 523. By exhausting the pressure from the pipe 524 the pressure is relieved from the cone support cylinders 138, the element in the pilot valve S returns to its initial position to close off the pipe 532 and allow the fluid to exhaust from the cylinder H through the pipe 320 through the valve to an exhaust port 531, and the spool 115 of the valve A returns to its initial position. As the pressure is exhausted from the cylinder H the piston 264 is returned to its initial position, swinging the lever 260 (Fig. 20) downwardly to move the spool 240 of the valve G to a position to allow fluid to flow through the valve to the cylinder 158 thereby causing the jacks to be moved forwardly to their initial starting positions. When the jacks have returned to their initial positions, the pin 593 (Fig. 33) in the jack segment 39 raises the levers 580 and 583 to cause the latching bar 576 to release the spool 512 of the control valve L thereby allowing the spool to be returned to its initial position by the spring 511. In this manner the pressurized fluid in the pipe 520 is exhausted through the valve L to the exhaust port 513 and the pipe 517 is once again placed in communication with the low pressure relief valve 516 through the pipe 518. When the valve element 115 of the valve A is returned to its initial position upon unlatching of the pilot valve N, the pipe 110 is closed off and the pressurized fluid in the pipe 111 is exhausted through the valve and the exhaust port 112. In this manner the cylinders B are exhausted to return the last pins to their initial positions, the cylinder C is exhausted to unlock the bar 308, and the locking cylinder D is exhausted to unlock the heel supports from the toe gage post, thereby completely releasing the shoes from the jacks. If the knob 628 (Fig. 33) has been moved to its forward position by the operator in the initial adjustment of the machine only the pilot valve N would have been unlatched to cause the jacks to return to initial positions and the spool 512 of the control valve L would remain in its operative position, since such a setting of the knob 628 renders the movement of the levers 580 and 583 (Fig. 38) by the pin 593 ineffective to unlatch the valve L. In this manner, the jacks are returned to their initial positions, but the shoes remain firmly locked thereon for subsequent manual operations to be performed by the operator. When the operator desires to release the shoes, he depresses the treadle 600 which, acting through the lever 605 (Figs. 38 and 39) and shoulder 608 thereon, causes the valve L to be unlatched, thereby allowing the fluid pressure in the chamber 116 of the valve A to be exhausted through the pipe 114, selector valve T, pipe 520 through the valve L to the exhaust port 513, thereby releasing the shoes from the jacks for removal therefrom.

Having thus described our invention, what we claim as new and desire to secure by Letters Patent of the United States is:

1. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable toward and away from said toe support to accommodate shoes of different sizes, and means operative in response to movement of said heel support toward and away from said toe support for moving the toe support more slowly in the same direction.

2. In a leveling machine, a leveling tool, a jack for carrying a shoe forwardly and rearwardly beneath said leveling tool to cause the tool to operate progressively along the bottom of the shoe on the jack, said jack comprising a gage to determine the initial position of the toe end of the shoe relative to said tool, a toe support, a heel support movable toward and away from said gage to accommodate shoes of different sizes, and means operative in response to movement of said heel support toward and away from said gage for moving the toe support heightwise relative to said tool.

3. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable toward and away from said toe support to accommodate shoes of different sizes, and means operative in response to movement of said heel support toward and away from said toe support for simultaneously moving the toe support heightwise relative to said tool and more slowly but in the same direction as the movement of the heel support.

4. In a leveling machine, a leveling tool, a jack for carrying a shoe forwardly and rearwardly beneath said leveling tool to cause the tool to operate progressively along the bottom of the shoe on the jack, said jack comprising a gage movable to determine the position of the toe end of the shoe relative to said tool prior to the start of the leveling operation, a heel support adjustable relatively to said gage in accordance with the size of shoe to be operated upon, and a toe support connected to said heel support for proportional movement therewith, whereby adjustment of said heel support causes said toe support to assume a predetermined position relative to said gage and to said heel support according to the size of shoe to be operated upon.

5. In a leveling machine, a leveling tool, a jack for carrying a shoe rearwardly and forwardly beneath said leveling tool to cause the tool to operate progressively along the bottom of the shoe on the jack, said jack comprising a gage movable to determine the position of the toe end of the shoe relative to said tool prior to the start of the leveling operation, a heel support adjustable relatively to said gage in accordance with the size of shoe to be operated upon, a toe support connected to said heel support for proportional movement therewith, and an intermediate support also connected to said heel support for proportional movement therewith and located between the heel support and the toe support whereby adjustment of said heel support causes said toe support and said intermediate support to assume predetermined positions relative to said gage and to said heel support according to the size of shoe to be operated upon.

6. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable toward and away from said toe support to accommodate shoes of different sizes, and means operative in response to movement of the toe end of a shoe into a predetermined relation to the toe support for locking the heel and toe supports together for unitary movements.

7. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable toward and away from said toe support to accommodate shoes of different sizes, means operative in response to movement of said heel support toward and away from said toe support for moving the toe support more slowly in the same direction, and means operative in response to movement of the toe end of a shoe into a predetermined relation to the toe support for locking the heel and toe supports together for unitary movements.

8. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable toward and away from said toe support to accommodate shoes of different sizes, means for determining the position of the toe end of the shoe relative to said tool prior to the start of the leveling operation, and means operable in response to movement of the toe end of the shoe into the position determined by said determining means for locking the heel and toe supports together for unitary movements.

9. In a leveling machine, a leveling tool, a jack for carrying a shoe forwardly and rearwardly beneath said leveling tool to cause the tool to operate progressively along the bottom of the shoe on the jack, said jack comprising a gage movable to determine the position of the toe end of the shoe relative to said tool prior to the start of the leveling operation, a heel support adjustable relatively to said gage in accordance with the size of shoe to be operated upon, and power operated means responsive to movement of said gage by engagement of the toe of a shoe on said heel support with said gage for fixing the position of the heel support relative to said gage.

10. In a leveling machine, a leveling tool, a jack for carrying a shoe forwardly and rearwardly beneath said leveling tool to cause the tool to operate progressively along the bottom of the shoe on the jack, said jack comprising a gage movable to determine the position of the toe end of the shoe relative to said tool, a heel support adjustable relatively to said gage in accordance with the size of shoe to be operated upon, and fluid pressure operated means for fixing the position of the heel support relative to said gage in response to movement of said gage by engagement of the toe end of a shoe on said heel support with said gage.

11. In a leveling machine, a leveling tool, a jack for carrying a shoe forwardly and rearwardly beneath said leveling tool to cause the tool to operate progressively along the bottom of the shoe on the jack, said jack comprising a gage movable to determine the position of the toe end of the shoe relative to said tool, a toe support, a heel support adjustable relatively to said gage in accordance with the size of shoe to be operated upon, said heel support including a last pin arranged to be received by a thimble in the heel end of a last, and power operated means for rocking said pin toewardly of a shoe thereon in response to movement of said gage by engagement of the toe end of a shoe on said heel support with said gage to force said toe end into firm engagement with the toe support.

12. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable toward and away from said toe support to accommodate shoes of different sizes, said heel support including a last pin arranged to be received by a thimble in the heel end of a last, and power operated means for rocking said pin toewardly of a shoe thereon in response to movement of the toe end of a shoe into a predetermined relation to the toe support for forcing said toe end into firm engagement with the toe support.

13. In a leveling machine, a leveling tool, a jack for carrying a shoe forwardly and rearwardly beneath said leveling tool to cause the tool to operate progressively along the bottom of a shoe on the jack, said jack comprising a gage movable to determine the position of the toe end of the shoe relative to said tool, a heel support adjustable relatively to said gage in accordance with the size of shoe to be operated upon, a toe support connected to said heel support for proportional movement therewith, power operated means for fixing the position of the heel support relative to said gage, said heel support including a last pin arranged to be received by a thimble in the heel end of a last, power operated means for rocking said pin toewardly of a shoe thereon to force said toe end into firm engagement with the toe support, and control means operative in response to movement of said gage by engagement of said toe end with said gage for causing operation of said rocking means and said fixing means to fix a shoe firmly on said jack.

14. In a leveling machine, a leveling tool, a jack for carrying a shoe rearwardly and forwardly beneath said leveling tool to cause the tool to operate progressively along the bottom of a shoe on the jack, power operated means for automatically imparting to said jack its rearward and forward movements according to a predetermined schedule, said jack comprising a gage movable to determine the position of the toe end of the shoe relative to said tool, a heel support adjustable relatively to said gage in accordance with the size of shoe to be operated upon, and a toe support connected to said heel support for proportional movement therewith, power operated means for fixing the position of the heel support relative to said gage, said heel support including a last pin arranged to be received by a thimble in the heel end of a last, power operated means for rocking said pin toewardly of a shoe thereon to force said toe end into firm engagement with the toe support, and control means operative in response to movement of said gage by engagement of the toe end of said shoe with said gage for causing operation of said rocking means and said fixing means to fix a shoe firmly on said jack, said control means also being operative in response to termination of the automatic operation of said first mentioned power operated means for causing said rocking means and said fixing means to release said shoe from the jack.

15. In a leveling machine, a leveling tool, a jack for carrying a shoe rearwardly and forwardly beneath said leveling tool to cause the tool to operate progressively along the bottom of the shoe on the jack, power operated means for automatically imparting to said jack its rearward and forward movements according to a predetermined schedule, said jack comprising a gage for determining the position of the toe end of the shoe relative to said tool, a heel support adjustable relatively to said gage in accordance with the size of shoe to be operated upon, and a toe support connected to said heel support for proportional movement therewith, power operated means for fixing the position of the heel support relative to said gage, said heel support including a last pin arranged to be received by a thimble in the heel end of a last, power operated means for rocking said pin toewardly of a shoe thereon to force said toe end into firm engagement with the toe support, control means operative in response to movement of said gage by engagement of the toe end of said shoe with said gage for causing operation of said rocking means and said fixing means to fix a shoe firmly on said jack, said control means also being operative in response to termination of the automatic operation of said first mentioned power operated means for causing said rocking means and said fixing means to release said shoe, and means for selectively rendering said control means ineffective to cause release of said shoe whereby, upon termination of the automatic operation of said jack, the shoe remains fixed on said jack to facilitate subsequent manual operations.

16. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable lengthwise of the shoe toward and away from said toe support in accordance with the size of shoe to be operated upon, means actuated by the lengthwise movement of said heel support for varying the heightwise position of the heel support relative to said tool, means operative in response to movement of said heel support lengthwise of the shoe for simultaneously moving the toe support heightwise relative to said tool and also more slowly but in the same direction as the lengthwise movement of the heel support, means for determining the position of the toe end of the shoe relatively to said tool prior to the start of the leveling operation, and means operable in response to movement of the toe end of the shoe into the position determined by said determining means for locking the heel and toe supports together for unitary movements.

17. In a leveling machine, a leveling tool, a jack for carrying a shoe forwardly and rearwardly beneath said leveling tool to cause the tool to operate progressively along the bottom of the shoe on the jack, said jack comprising a toe support, a heel support movable lengthwise of the shoe toward and away from said toe support in accordance with the size of shoe to be operated upon, means actuated by the lengthwise movement of said heel support for varying the heightwise position of the heel support relative to said tool, means operative in response to movement of said heel support lengthwise of the shoe for simultaneously moving the toe support heightwise relative to said tool and also more slowly but in the same direction as the lengthwise movement of the heel support, means for determining the position of the toe end of the shoe relatively to said tool, and means controlled by said last named means for locking the heel and toe supports against relative movement prior to the start of the leveling operation of the machine.

18. In a leveling machine, a leveling tool, a jack for carrying a shoe forwardly and rearwardly beneath said leveling tool to cause the tool to operate progressively along the bottom of the shoe on the jack, said jack comprising a gage movable to determine the position of the toe end of the shoe relative to said tool, a heel support adjustable relatively to said gage in accordance with the size of shoe to be operated upon, said heel support including a last pin arranged to be received by a thimble in the heel end of a last, power operated means for rocking said pin toewardly of a shoe thereon in response to movement of said gage by engagement of the toe end of the shoe on said heel support with said gage to force said toe end into firm engagement with the toe support, and means actuated by movement of said heel support relative to said gage for varying the effectiveness of said rocking means, thereby varying the force exerted to press said toe end into firm engagement with the toe support in accordance with the size of shoe on said jack.

19. In a leveling machine, a leveling tool, a jack for carrying a shoe forwardly and rearwardly beneath said leveling tool to cause the tool to operate progressively along the bottom of the shoe on the jack, said jack comprising a toe support, a heel support, means pivotally mounting said heel support for movement toward and away from said toe support, and means for imparting a heightwise movement to said heel support as it is moved toward and away from said toe support.

20. In a leveling machine, a leveling tool, a jack for carrying a shoe forwardly and rearwardly beneath said leveling tool to cause the tool to operate progressively along the bottom of the shoe on the jack, said jack comprising a gage for positioning the toe end of the shoe relative to said tool, a heel support adjustable relatively to said gage in accordance with the size of shoe to be operated upon, and means actuated by movement of said heel support relative to said gage for varying the heightwise position of the heel support relative to said tool according to the size of shoe to be operated upon.

21. In a leveling machine, a leveling tool, a jack for carrying a shoe forwardly and rearwardly beneath said leveling tool to cause the tool to operate progressively along the bottom of the shoe on the jack, said jack comprising a gage for positioning the toe end of the shoe relative to said tool, a heel support adjustable relatively to said gage in accordance with the size of shoe to be operated upon, means actuated by movement of said heel support relative to said gage for varying the heightwise position of the heel support relative to said tool according to the size of shoe to be operated upon, and a toe support connected to said heel support for proportional movement therewith, said toe support being mounted for movement heightwise relative to said tool during its movement with said heel support whereby the bottom of any shoe on said jack is presented to the leveling tool at a predetermined heightwise position regardless of size.

22. In a leveling machine, a leveling tool, a shoe support mounted for rearward and forward movements beneath said leveling tool to cause the tool to operate progressively along the bottom of a shoe on said support, power operated means for imparting to said shoe support its rearward and forward movements, and control mechanism for controlling the operation of said power operated mechanism, comprising a master cam for causing a basic schedule of motions of said shoe support and a plurality of modifying cams, each one of said modifying cams modifying the action of selected portions of said master cam.

23. In a leveling machine, a leveling tool, a shoe support mounted for rearward and forward movements beneath said leveling tool to cause the tool to operate progressively along the bottom of a shoe on said support, power operated means for imparting to said shoe support its rearward and forward movements, control mechanism for controlling the operation of said power operated mechanism, comprising a master cam for causing a basic schedule of motions of said shoe support and a plurality of modifying cams, each one of said modifying cams modifying the action of selected portions of said master cam, and a differential mechanism for converting the combined output of the master and modifying cams into a single motion controlling said power operated mechanism.

24. In a leveling machine, a leveling tool, a shoe support mounted for rearward and forward movements beneath said leveling tool to cause the tool to operate progressively along the bottom of a shoe on said support, power operated means for imparting to said shoe support its rearward and forward movements, control mechanism for controlling the operation of said power operated mechanism, comprising a master cam for causing a basic schedule of motions of said shoe support and a plurality of modifying cams, each one of said modifying cams modifying the action of selected portions of said master cam, and means for adjusting the output of any one modifying cam without affecting the output of the other modifying cams, whereby a selected portion of the motion of said shoe support may be varied.

25. In a leveling machine, a leveling tool, a shoe support for carrying a shoe forwardly and rearwardly beneath said leveling tool to cause the tool to operate progressively along the bottom of the shoe on said support, said support comprising a gage for positioning the toe end of the shoe relative to said tool and a heel support adjustable relatively to said gage in accordance with the size of shoe to be operated upon, power operated means for imparting to said shoe support its rearward and forward movements, control means for controlling the operation of said power operated means to cause said shoe support to be moved rearward and forward in accordance with a predetermined schedule, comprising a master cam for causing a basic schedule of motions of said shoe support and a plurality of modifying cams, each one of said plurality of cams modifying the action of selected portions of said master cam, and means actuated by the motion of said heel support relative to said gage for varying the combined output of said cams proportionally according to the size of shoe to be operated upon.

26. In a leveling machine, a leveling tool, a shoe support for carrying a shoe forwardly and rearwardly beneath said leveling tool to cause the tool to operate progressively along the bottom of the shoe on said support, said support comprising a gage for positioning the toe end of the shoe in a predetermined position relative to said tool, and a heel support adjustable relatively to said gage in accordance with the size of shoe to be operated upon, power operated means for imparting to said shoe support its rearward and forward movements, control means for controlling the operation of said power operated means to cause said shoe support to be moved rearward and forward in accordance with a predetermined schedule comprising a master cam for causing a basic schedule of motions of said shoe support and a plurality of modifying cams, each one of said plurality of cams modifying the action of selected portions of said master cam, means controlled by the motion of said heel support relative to said gage for varying the combined output of said cams proportionally according to the size of shoe to be operated upon, and means for adjusting the output of any one modifying cam without affecting the output of the other modifying cams, whereby a selected portion of the motion of said shoe support may be varied.

27. In a leveling machine, a shoe support and a leveling roll relatively movable lengthwise of a shoe on said support to cause the roll to operate progressively along the shoe bottom, power operated means for moving said roll relatively to the support about an axis extending lengthwise of the shoe to vary the inclination of the roll relatively to the bottom of the shoe, control means for controlling the operation of said power operated means to cause the inclination of said roll to be varied in accordance with a predetermined schedule during the lengthwise relative movement of the shoe support and the leveling roll comprising a plurality of control cams, each one of said plurality of cams controlling the inclination of said roll during a predetermined portion of the motion of said shoe support, and a differential mechanism for converting the combined output of the control cams into one motion controlling the operation of said power operated means.

28. In a leveling machine, a leveling tool, a shoe support mounted for rearward and forward movements beneath said leveling tool to cause the tool to operate progressively along the bottom of a shoe on said support, a first power operated means for imparting to said shoe support its rearward and forward movements, a first control means for controlling the operation of said first power operated means to cause said shoe support to be moved rearward and forward in accordance with a predetermined schedule comprising a master cam for causing a basic schedule of motions of said shoe support and a plurality of modifying cams, each one of said plurality of cams modifying the action of selected portions of said master cam, a second power operated means for moving said tool relatively to the shoe support about an axis extending lengthwise of the shoe to vary the inclination of the tool relatively to the bottom of the shoe, a second control means for controlling the operation of said second power operated means to cause the inclination of said tool to be varied in accordance with a predetermined schedule during the lengthwise relative movement of the shoe support comprising a plurality of control cams, each one of said control cams controlling the inclination of said tool during a predetermined portion of the motion of said shoe support.

29. In a leveling machine, a leveling tool, a shoe support mounted for rearward and forward movements beneath said leveling tool to cause the tool to operate progressively along the bottom of a shoe on said support, a first power operated means for imparting to said shoe support its rearward and forward movements, a first control means for controlling the operation of said first power operated means to cause said shoe support to be moved rearward and forward in accordance with a predetermined schedule comprising a master cam for causing a basic schedule of motions of said shoe support and a plurality of modifying cams, each one of said modifying cams modifying the action of selected portions of said master cam, a second power operated means for moving said tool relatively to the shoe support about an axis extending lengthwise of the shoe to vary the inclination of the tool relatively to the bottom of the shoe, a second control means for controlling the operation of said second power operated means to cause the inclination of said tool to be varied in accordance with a predetermined schedule during the lengthwise relative movement of the shoe support comprising a plurality of control cams, each one of said control cams controlling the inclination of said tool during a predetermined portion of the motion of said shoe support, and means for independently adjusting the output of any one of said modifying cams and said control cams without affecting the output of any other cam, whereby selected portions of the motion of said shoe support and the motion of inclination of said tool may be independently varied.

30. In a leveling machine, a leveling tool, a shoe support for carrying a shoe forwardly and rearwardly beneath said leveling tool to cause the tool to operate progressively along the bottom of the shoe on the shoe support, said shoe support comprising a gage for determining the position of the toe end of the shoe relative to said tool, and a heel support adjustable relatively to said gage in accordance with the size of shoe to be operated upon, first power operated means for imparting to said shoe support its rearward and forward movements, second power operated means for moving said tool relatively to the support about an axis extending lengthwise of the shoe to vary the inclination of the tool relatively to the bottom of the shoe, first control means for controlling the operation of said first power operated means to cause said shoe support to be moved forward and rearward in accordance with a predetermined schedule comprising a master cam for causing a basic schedule of motions of said shoe support and a plurality of modifying cams, each one of said modifying cams modifying the action of selected portions of said master cam, means controlled by the motion of said heel support relative to said gage for varying the combined output of said master cam and said modifying cams proportionally according to the size of shoe to be operated upon, second control means for controlling the operation of said second power operated means to cause the inclination of said tool to be varied in accordance with a predetermined schedule during the lengthwise movement of the shoe support, comprising a plurality of control cams, each one of said control cams controlling the inclination of said tool during a predetermined portion of the motion of said shoe support.

31. In a leveling machine, a leveling tool, a shoe support for carrying a shoe forwardly and rearwardly beneath said leveling tool to cause the tool to operate progressively along the bottom of the shoe on the shoe support, said shoe support comprising a gage for determining the position of the toe end of the shoe in a predetermined position relative to said tool, and a heel support adjustable relatively to said gage in accordance with the size of shoe to be operated upon, first power operated means for imparting to said shoe support its rearward and forward movements, second power operated means for moving said tool relatively to the support about an axis extending lengthwise of the shoe to vary the inclination of the tool relatively to the bottom of the shoe, first control means for controlling the operation of said first power operated means to cause said shoe support to be moved forward and rearward in accordance with a predetermined schedule comprising a master cam for causing a basic schedule of motions of said shoe support and a plurality of modifying cams, each one of said modifying cams modifying the action of selected portions of said master cam, means controlled by the motion of said heel support relative to said gage for varying the combined output of said master cam and said modifying cams proportionally according to the size of shoe to be operated upon, second control means for controlling the operation of said second power operated means to cause the inclination of said tool to be varied in accordance with a predetermined schedule during the lengthwise movement of the shoe support, comprising a plurality of control cams, each one of said control cams controlling the inclination of said tool during a predetermined portion of the motion of said shoe support and means for adjusting the output of any one of said modifying cams and said control cams without affecting the output of any other cam, whereby selected portions of the motion of said shoe support and the motion of inclination of said tool may be varied.

32. In a leveling machine, a leveling tool, a shoe support mounted for rearward and forward movements beneath said leveling tool to cause the tool to operate progressively along the bottom of a shoe on said support, power operated means for imparting to said shoe support its rearward and forward movements, first control means for controlling the operation of said power operated means to cause said shoe support to be moved rearward and forward in accordance with a predetermined schedule, and a second control means for causing said power operated means to move the shoe support from an initial position spaced from said tool to a predetermined second position where the toe end of a shoe on said shoe support is positioned under said tool, said first control means being operative only after said shoe support has been moved to said second position.

33. In a leveling machine, a leveling tool, a shoe support mounted for rearward and forward movements beneath said leveling tool to cause the tool to operate progressively along the bottom of a shoe on said support, power operated means for imparting to said shoe support its rearward and forward movements, a first control means for controlling the operation of said power operated means to cause said shoe support to be moved rearward and forward in accordance with a predetermined schedule, a second control means for causing said power operated means to move the shoe support from an initial position spaced forwardly of said tool to a variable second position where the toe end of a shoe on said shoe support is located in a desired predetermined position under said tool, said first control means being operative only after said shoe support has arrived at said second position, and operator controlled means for modifying the action of said second control means to predetermine said second position to which the shoe support is moved by the power operated means under the influence of said second control means.

34. In a leveling machine, a leveling tool, a shoe support mounted for rearward and forward movements beneath said leveling tool to cause the tool to operate progressively along the bottom of a shoe on said support, a spring normally holding said tool in an inoperative position, fluid pressure means for causing said tool to be moved against the action of said spring to an operative position for applying pressure to the bottom of a shoe on said support, power operated means for imparting to said shoe support its rearward and forward movements, and control means for causing operation of said power operated means to move said shoe support from a first position spaced from said tool to a second predetermined position where the toe end of a shoe on said support is positioned under said tool, said fluid pressure means being operative upon termination of the operation of said control means for causing said tool to be moved to its operative position for applying pressure against the shoe bottom only after the shoe support has been moved to its second position.

35. In a leveling machine, a leveling tool, a shoe support mounted for rearward and forward movements beneath said leveling tool to cause the tool to operate progressively along the bottom of a shoe on said support, fluid pressure means for moving said tool from an inoperative position to a position adapted to apply pressure to the bottom of a shoe under said tool, power operated means for imparting to said shoe support its rearward and forward movements, a first control means for controlling operation of said power operated means to cause said shoe support to be moved rearward and forward in accordance with a predetermined schedule, a second control means for causing said power operated means to move said shoe support from an initial position spaced from said tool to a variable second position where the toe end of a shoe on said support is located in a desired predetermined position under said tool, said fluid pressure means and said first control means being operative only after the shoe support has moved to its second position, and operator controlled means for modifying the action of said second control means to predetermine said second position to which the shoe support is moved by the power operated means under the influence of said second control means.

36. In a leveling machine, a leveling tool, a shoe support mounted for rearward and forward movements beneath said leveling tool to cause the tool to operate progressively along the bottom of a shoe on said support, fluid pressure means for moving said tool from an inoperative position to a position adapted to apply pressure to the bottom of a shoe under said tool, an adjustable pressure relief valve for controlling the amount of pressure applied to the shoe bottom by said tool, power operated means for imparting to said shoe support its rearward and forward movements, a first control means for controlling operation of said power operated means to cause said shoe support to be moved rearward and forward in accordance with a predetermined schedule, a second control means for causing said power operated means to move said shoe support from a first position spaced from said tool to a variable second position where the toe end of a shoe on said support is located in a desired predetermined position under said tool, said fluid pressure means and said first control means being operative only after the shoe support has moved to its second position, and operator controlled means for modifying the action of said second control means to predetermine said second position, said operator controlled means also being effective to vary the adjustment of the pressure relief valve whereby the pressure applied to the shoe bottom by said tool is varied in accordance with the selected predetermined second position.

References Cited in the file of this patent

UNITED STATES PATENTS 1,030,827     McFeely _____ June 25, 1912